United States Patent
Ohshiba et al.

(10) Patent No.: US 10,164,229 B2
(45) Date of Patent: Dec. 25, 2018

(54) ENERGY STORAGE APPARATUS

(71) Applicant: GS Yuasa International Ltd., Kyoto-shi, Kyoto (JP)

(72) Inventors: Masashi Ohshiba, Kyoto (JP); Hiroyasu Koyama, Kyoto (JP); Kazuya Fujisawa, Kyoto (JP); Yuta Mizukawa, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 470 days.

(21) Appl. No.: 14/675,179

(22) Filed: Mar. 31, 2015

(65) Prior Publication Data
US 2015/0280193 A1    Oct. 1, 2015

(30) Foreign Application Priority Data

Mar. 31, 2014 (JP) .................. 2014-073394

(51) Int. Cl.
| | |
|---|---|
| *H01M 2/16* | (2006.01) |
| *H01M 2/14* | (2006.01) |
| *H01M 2/02* | (2006.01) |
| *H01G 9/08* | (2006.01) |
| *H01M 2/12* | (2006.01) |
| *H01G 9/15* | (2006.01) |
| *H01M 2/10* | (2006.01) |
| *H01M 2/34* | (2006.01) |

(Continued)

(52) U.S. Cl.
CPC .............. *H01M 2/16* (2013.01); *H01G 9/08* (2013.01); *H01G 9/15* (2013.01); *H01M 2/02* (2013.01); *H01M 2/1061* (2013.01); *H01M 2/1077* (2013.01); *H01M 2/12* (2013.01); *H01M 2/127* (2013.01); *H01M 2/1653* (2013.01); *H01M 2/348* (2013.01); *H01M 10/658* (2015.04); *H01M 10/4257* (2013.01); *H01M 2200/20* (2013.01)

(58) Field of Classification Search
CPC ........................................ H01M 2/14–2/1666
See application file for complete search history.

(56) References Cited

U.S. PATENT DOCUMENTS

| | | |
|---|---|---|
| 2006/0093899 A1 | 5/2006 | Jeon et al. |
| 2010/0143773 A1 | 6/2010 | Honbou |
| 2010/0266880 A1 | 10/2010 | Hirakawa et al. |

(Continued)

FOREIGN PATENT DOCUMENTS

| | | |
|---|---|---|
| JP | 2006-128122 A | 5/2006 |
| JP | 2009-211907 A | 9/2009 |

(Continued)

OTHER PUBLICATIONS

Extended Search Report issued in European Application No. 15160711.6, dated Oct. 2, 2015.

*Primary Examiner* — Stephan J Essex
(74) *Attorney, Agent, or Firm* — Michael Best & Friedrich LLP

(57) ABSTRACT

An energy storage apparatus includes: one or more energy storage devices; an outer covering arranged outside the one or more energy storage devices; a partition member arranged on a side of any one of the one or more energy storage devices; and a supporter which supports the partition member at a predetermined position. The supporter is formed of a heat resistant member.

14 Claims, 15 Drawing Sheets

(51) Int. Cl.
*H01M 10/658* (2014.01)
*H01M 10/42* (2006.01)

(56) References Cited

U.S. PATENT DOCUMENTS

| | | | |
|---|---|---|---|
| 2012/0315519 A1 | 12/2012 | Jin | |
| 2013/0004813 A1* | 1/2013 | Kim | H01M 2/1077 |
| | | | 429/87 |
| 2013/0071705 A1* | 3/2013 | Frutschy | H01M 2/1016 |
| | | | 429/62 |
| 2013/0146249 A1 | 6/2013 | Katayama et al. | |
| 2013/0183573 A1* | 7/2013 | Yoshioka | H01M 2/1077 |
| | | | 429/159 |
| 2013/0236759 A1 | 9/2013 | Kusaba et al. | |
| 2013/0273404 A1 | 10/2013 | Ochi et al. | |
| 2013/0280565 A1* | 10/2013 | Lee | H01M 2/0207 |
| | | | 429/71 |

FOREIGN PATENT DOCUMENTS

| | | |
|---|---|---|
| JP | 2009-277575 A | 11/2009 |
| JP | 2010-010460 A | 1/2010 |
| JP | 2011-216424 A | 10/2011 |
| JP | 2012-064357 A | 3/2012 |
| JP | 2012-160260 A | 8/2012 |
| JP | 2012-248374 A | 12/2012 |
| JP | 2013-004523 A | 1/2013 |
| JP | 2013-122817 A | 6/2013 |
| WO | WO-2012/057322 A1 | 5/2012 |

\* cited by examiner

ENERGY STORAGE APPARATUS

CROSS-REFERENCE TO RELATED APPLICATIONS

This application claims the benefit of Japanese patent application No. 2014-073394, filed on Mar. 31, 2014, which is incorporated by reference.

FIELD

The present invention relates to an energy storage apparatus which includes one or more energy storage devices and an outer covering arranged outside such one or more energy storage devices.

BACKGROUND

Concerning an energy storage apparatus in which energy storage devices are housed in an outer covering, there has been known the configuration, where a spacer (a partition member) is disposed between the energy storage devices. The spacer is generally made of a resin and hence, when the energy storage device arranged adjacent to the spacer is overheated to a high temperature, there is a possibility that the spacer is deformed due to heat.

Conventionally, there has been proposed an energy storage apparatus where the deformation of the spacer due to heat generated by the energy storage device can be prevented (for example, see JP-A-2009-277575). In such an energy storage apparatus, the spacer includes a projecting portion made of a material having a high melting point at a position which faces the energy storage device so that the thermal deformation of the spacer is prevented by the projecting portion.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In the above-mentioned conventional configuration, when the energy storage device is overheated, a portion of the spacer made of a material having a low melting point may be thermally deformed so that the whole shape of the energy storage apparatus may collapse. Thus, an energy storage device arranged adjacent to the overheated energy storage device may be adversely affected.

That is, in the above-mentioned conventional configuration, it may be possible to prevent the thermal deformation of the projecting portion made of the material having a high melting point which faces the energy storage device. However, a portion of the spacer other than the projecting portion having a low melting point may be deformed due to heat generated by the energy storage device when the energy storage device is overheated. In this case, the spacer which is deformed due to heat generated by the energy storage device may be inclined between the energy storage devices so that the whole shape of the energy storage apparatus may collapse, and thus an energy storage device arranged adjacent to the overheated energy storage device may be adversely affected.

An object of the present invention to provide an energy storage apparatus which can prevent the deformation of the whole shape of an energy storage apparatus even when an energy storage device is overheated.

An energy storage apparatus according to an aspect of the present invention includes one or more energy storage devices; an outer covering arranged outside the one or more energy storage devices; a partition member arranged on a side of any one of the one or more energy storage devices; and a supporter which supports the partition member at a predetermined position, wherein the supporter is formed of a heat resistant member.

BRIEF DESCRIPTION OF THE DRAWINGS

The foregoing and other features of the present invention will become apparent from the following description and drawings of an illustrative embodiment of the invention in which.

DESCRIPTION OF EMBODIMENTS

Figure 1:
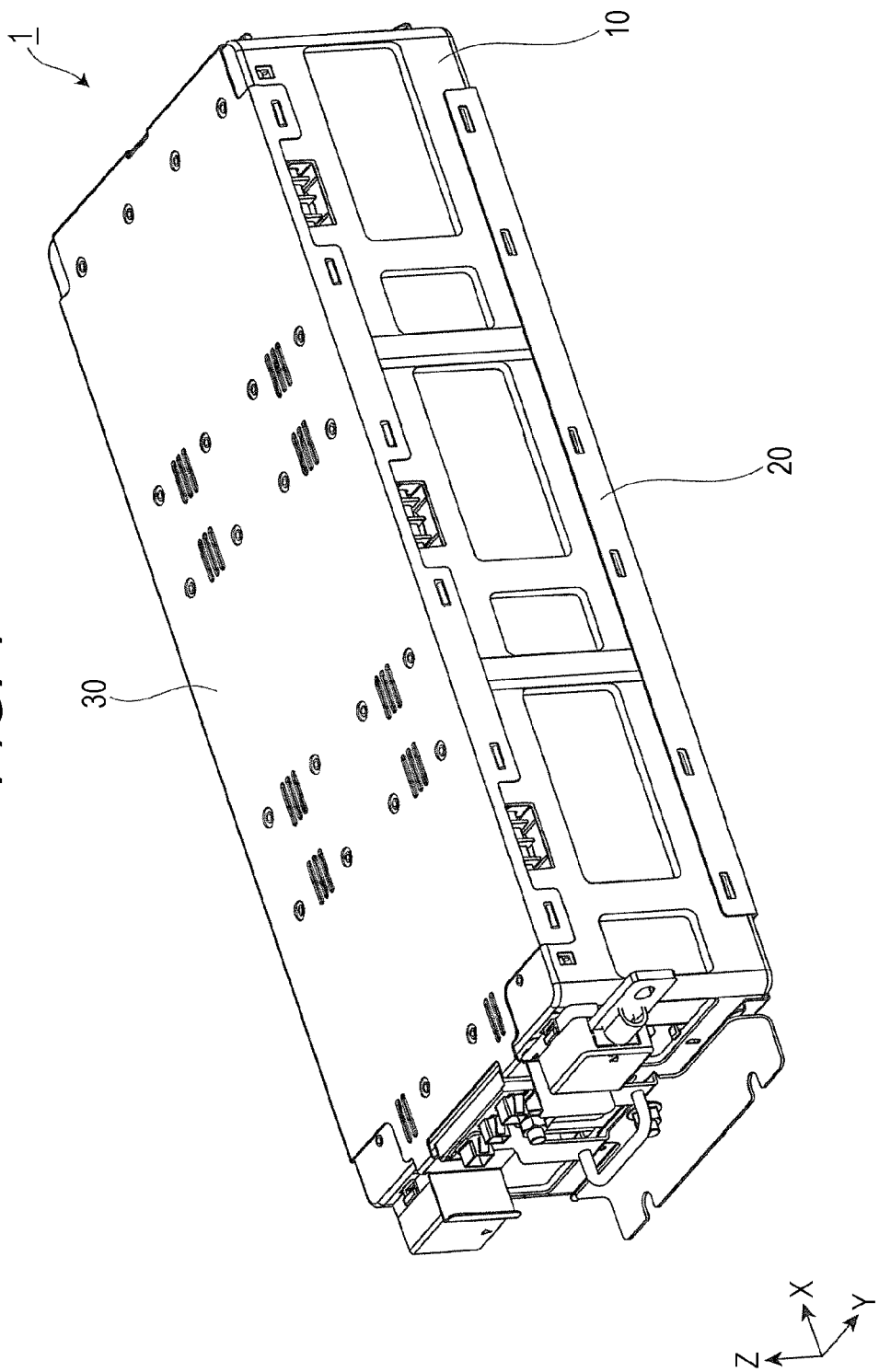
FIG. 1 shows an external appearance of an energy storage apparatus according to an embodiment of the present invention in a perspective manner.

An energy storage apparatus according to a first aspect of the present invention includes one or more energy storage devices; an outer covering arranged outside the one or more energy storage devices; a partition member arranged on a side of any one of the one or more energy storage devices; and a supporter which supports the partition member at a predetermined position, wherein the supporter is formed of a heat resistant member.

With this configuration, the energy storage apparatus includes the supporter which supports the partition member arranged on a side of the energy storage device at a predetermined position, and the supporter is formed of a heat resistant member. That is, the supporter which supports the partition member is formed of a heat resistant member and hence, irrespective of a material used for forming the partition member, the deformation of the supporter due to heat can be prevented. Accordingly, even when the energy storage device is overheated to a high temperature, the supporter having heat resistance can continuously support the partition member on the outer covering at the predetermined position and hence, the deformation of the whole shape of the energy storage apparatus can be prevented.

The supporter may be formed of a member having higher heat resistance than the outer covering.

With this configuration, the supporter is formed using a material having higher heat resistance than the outer covering. Hence, even when the energy storage device is overheated to a high temperature, the supporter can continuously support the partition member at the predetermined position.

The energy storage apparatus may further include a regulator which is arranged adjacent to the supporter, is fixed to the outer covering, and restricts the movement of the supporter in a sideward direction, and the supporter may be formed of a member having higher heat resistance than the regulator.

With this configuration, the energy storage apparatus includes the regulator which regulates the movement of the supporter in a sideward direction, and the supporter is formed using a member having higher heat resistance than the regulator. Accordingly, the supporter can be stably fixed to the outer covering by the regulator. Even when the energy storage device is overheated to a high temperature, the supporter can continuously support the partition member at the predetermined position.

The supporter may include two support members which are arranged to pinch the partition member from both sides.

With this configuration, because the supporter pinches the partition member from both sides, the supporter can continuously support the partition member in a stable manner. Accordingly, even when the energy storage device is overheated to a high temperature in the energy storage apparatus, the deformation of the whole shape of the energy storage apparatus can be further prevented.

The outer covering may have a recessed portion, and the supporter may include a fitting part which is fitted in the recessed portion.

With this configuration, because the supporter is fitted in the recessed portion formed in the outer covering, the supporter is arranged on the outer covering in a stable manner. Accordingly, the supporter can continuously support the partition member in a stable manner and hence, even when the energy storage device is overheated to a high temperature, the deformation of the whole shape of the energy storage apparatus can be further prevented.

A space may be formed in the inside of the supporter.

With this configuration, because the space is formed in the inside of the supporter, a heat insulating property of the supporter can be enhanced by the space.

The supporter may be arranged at a position where the supporter supports the partition member arranged at a center position of the outer covering.

With this configuration, the supporter is arranged at the center position of the energy storage apparatus. The temperature of the energy storage apparatus is likely to be higher at the center position of the energy storage apparatus. Accordingly, by arranging the supporter at the center position of the energy storage apparatus where the temperature of the energy storage apparatus is likely to be highest, the deformation of the shape of the energy storage apparatus at the center position can be prevented.

The supporter may be configured to be detachably attached to the outer covering.

With this configuration, because the supporter is detachably attached to the outer covering, the supporter can be arranged as needed so that the degree of freedom in designing the supporter can be enhanced. Further, by preventing the supporter from being arranged at a place where the supporter is unnecessary or by recycling the supporter, a manufacturing cost of the energy storage apparatus can be reduced.

Any one of the one or more energy storage devices may include a safety valve, the supporter may include a flow path forming portion which forms a flow path for a discharge through the safety valve, and the flow path forming portion may support an end portion of the partition member.

With this configuration, the supporter supports the end portion of the partition member by the flow path forming portion which constitutes a flow path for a discharge through the safety valve. That is, by supporting the partition member by making use of the flow path forming portion, the partition member can be supported in a stable manner. Accordingly, even when the energy storage device is overheated to a high temperature, the deformation of the whole shape of the energy storage apparatus can be prevented.

The supporter may be formed using a thermosetting resin.

With this configuration, the supporter is made of a thermosetting resin. Accordingly, compared with the case where the supporter is made of ceramic or the like, the supporter made of a thermosetting resin can be easily joined to the outer covering using an adhesive agent and can be easily processed and hence, the manufacture of the energy storage apparatus can be simplified. Further, the supporter made of a thermosetting resin is inexpensive compared with the supporter made of ceramic or the like and hence, a manufacturing cost can be reduced.

An opening may be formed in the flow path forming portion, and the partition member may have a projecting portion which is inserted into the opening.

With this configuration, by inserting the projecting portion of the partition member into the opening formed in the flow path forming portion, the partition member is fixed to the flow path forming portion and hence, the partition member can be supported in a stable manner.

According to the aspects of the present invention, the deformation of the whole shape of the energy storage apparatus can be prevented even when the energy storage device is overheated.

Hereinafter, an energy storage apparatus according to an embodiment of the present invention is described with reference to drawings. The embodiment described hereinafter describes preferred specific examples of the present invention. Numerical values, shapes, materials, components, the arrangement positions and connection states of the components and the like are merely examples, and these are not intended to be used for limiting the present invention. Further, out of the components in the embodiment described hereinafter, components which are not described in the independent claim describing an uppermost concept are described as optional components.

EMBODIMENT

Firstly, the configuration of an energy storage apparatus 1 is described.

Figure 2:
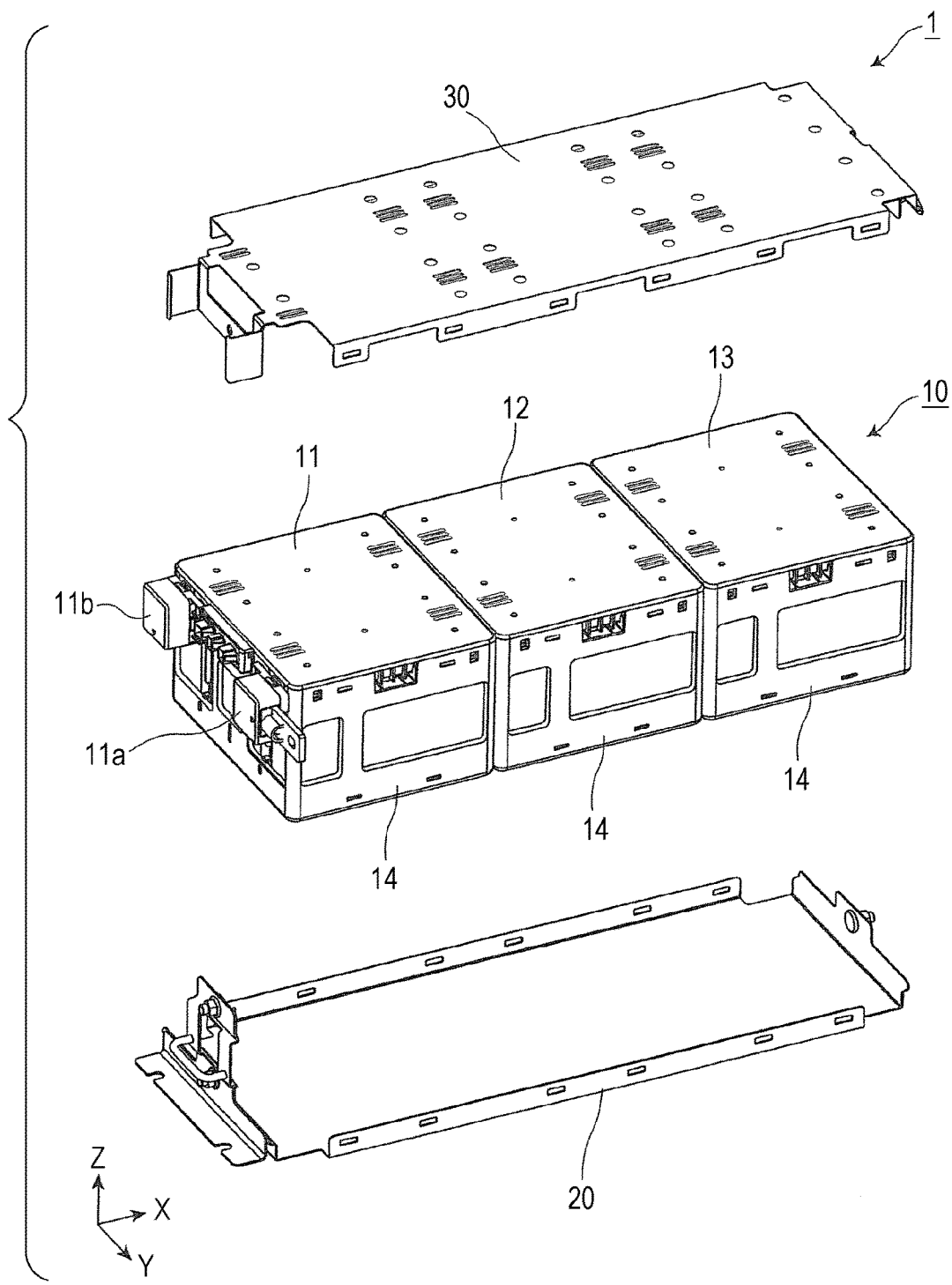
FIG. 2 shows components of the energy storage apparatus according to the embodiment of the present invention in an exploded and perspective manner.

FIG. 1 shows an external appearance of the energy storage apparatus 1 according to an embodiment of the present invention in a perspective manner. FIG. 2 shows components of the energy storage apparatus 1 according to the embodiment of the present invention in an exploded and perspective manner.

In these figures, the Z axis direction is indicated as the vertical direction, and the description is made hereinafter using the Z axis direction as the vertical direction. However, there may be also a case where the Z axis direction does not indicate the vertical direction depending on a use mode and hence, the Z axis direction is not limited to the vertical direction. The same goes for drawings described hereinafter.

The energy storage apparatus 1 is a device which can be charged with electricity from the outside or can discharge electricity to the outside. For example, the energy storage apparatus 1 is a battery module of a high voltage used for power storage application or power source application.

As shown in these figures, the energy storage apparatus 1 includes: a module set 10 having a plurality of unit modules 11, 12 and 13; a lower plate 20 and an upper plate 30. Alternatively, the energy storage apparatus 1 may be configured to include only one unit module. The energy storage apparatus 1 may be configured to include a cooling device such as a cooling fan for allowing a cooling medium (air or the like) to flow into the inside of the module set 10 at an end portion thereof on a plus side in the X axis direction, for example.

The module set 10 includes the plurality of unit modules 11, 12 and 13 arranged in a row in the X-axis-direction. The unit module 11 includes: a positive external terminal cover 11a which is a cover for a positive external terminal described later; and a negative external terminal cover 11b which is a cover for a negative external terminal described later. The energy storage apparatus 1 is charged with electricity from the outside or discharges electricity to the outside through the positive external terminal disposed in the inside of the positive external terminal cover 11a and the negative external terminal disposed in the inside of the negative external terminal cover 11b.

The unit modules 11, 12 and 13 are each formed of a rectangular module where one or more energy storage devices are housed in an outer covering 14, and have the substantially same configuration. Among the unit modules 11, 12 and 13, by electrically connecting a positive terminal and a negative terminal of the unit modules arranged adjacent to each other, all energy storage devices in the inside of the unit modules 11, 12 and 13 are connected in series. The detailed configuration of these unit modules 11, 12 and 13 is described later.

The lower plate 20 and the upper plate 30 are members for connecting the plurality of unit modules 11, 12 and 13, wherein the lower plate 20 is a connecting member disposed on a lower side and the upper plate 30 is a connecting member disposed on an upper side. That is, the unit modules 11, 12 and 13 are connected to each other by fixing the unit modules 11, 12 and 13 in a sandwiching manner by the lower plate 20 and the upper plate 30.

To be more specific, the lower plate 20 and the upper plate 30 are formed of a planar member, and are formed using metal or the like, for example. Due to such a configuration, the unit modules 11, 12 and 13 can be fixed firmly and in a stable manner. Outer coverings 14 provided to the plurality of unit modules 11, 12 and 13 are mounted on the lower plate 20.

Next, the detailed configuration of the unit modules 11, 12 and 13 contained in the module set 10 is described. Since the unit modules 11, 12 and 13 have the substantially same configuration, hereinafter, the description is made with respect to the unit module 11, and the description of the configuration of the unit modules 12 and 13 is omitted.

Figure 3:
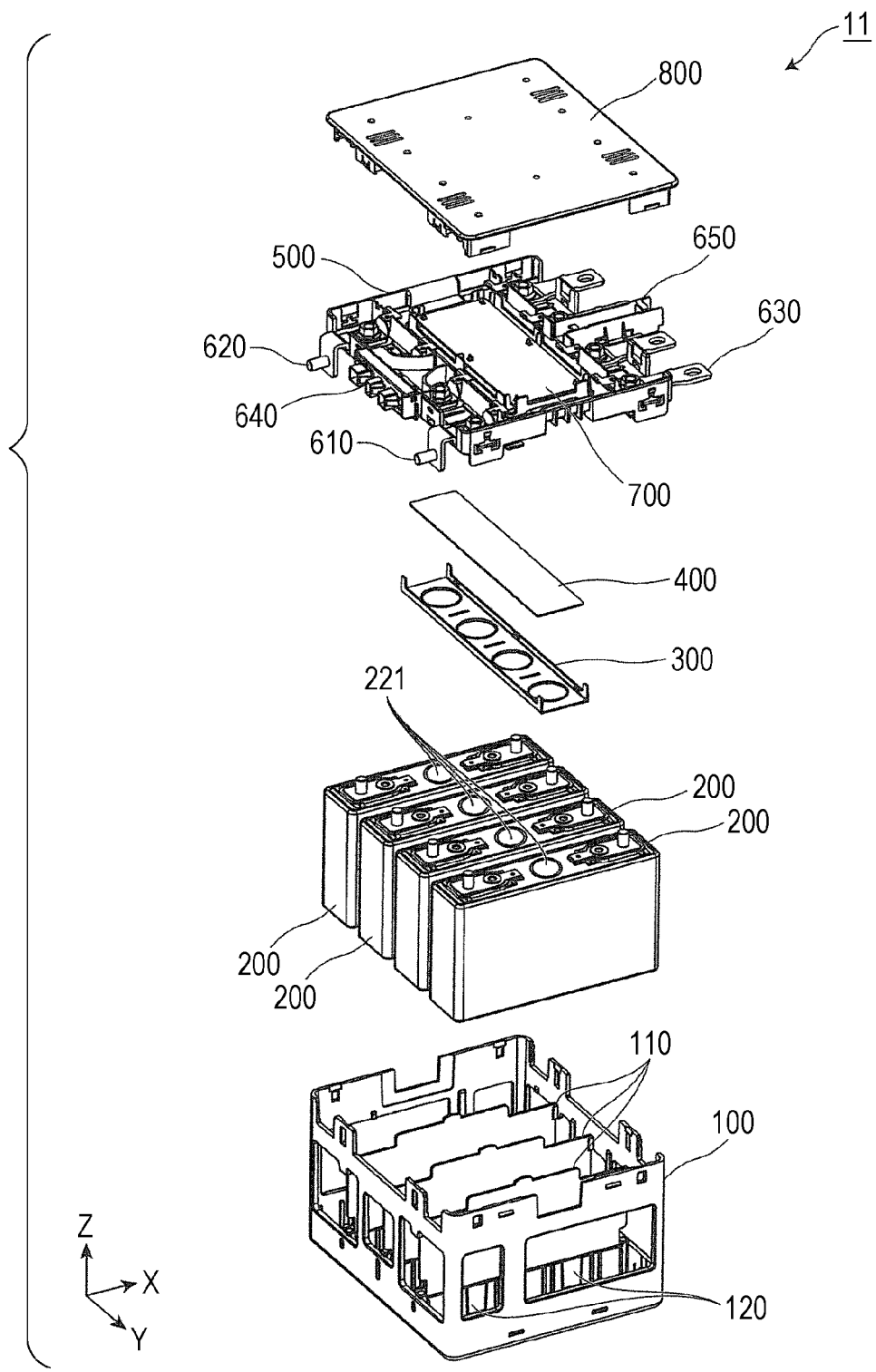
FIG. 3 shows components of a unit module according to the embodiment of the present invention in an exploded and perspective manner.

FIG. 3 shows components of the unit module 11 according to the embodiment of the present invention in an exploded and perspective manner.

As shown in FIG. 3, the unit module 11 includes: the outer covering 14 constituted of an outer covering body 100, an inner lid 500 and a lid member 800; and a plurality of energy storage devices 200 (four energy storage devices 200 in the figure), a flow path forming portion 300, a heat insulation member 400, a printed circuit board 700, and the like, which are housed in the outer covering 14. It is not always necessary that the plurality of energy storage devices 200 are housed in the inside of the outer covering 14, and only one energy storage device 200 may alternatively be housed in the inside of the outer covering 14.

The outer covering 14 is a container (module case) having a rectangular shape (box shape) which is arranged outside the energy storage devices 200 and constitutes an outer covering of the unit module 11. In the outer covering 14, the plurality of energy storage devices 200, the printed circuit board 700 and the like are arranged at predetermined positions so that the plurality of energy storage devices 200, the printed circuit board 700 and the like are protected from an impact or the like. The outer covering 14 is formed using an insulation material such as a resin, that is, a polycarbonate, a polypropylene (PP) or the like, for example. The outer covering 14 prevents the energy storage devices 200, the printed circuit board 700 and the like from coming into contact with a metal member or the like outside the unit module 11.

The outer covering 14 includes the outer covering body 100, the inner lid 500 and the lid member 800. The outer covering body 100 is a bottomed rectangular cylindrical member which constitutes a body of the outer covering 14. Partition members 110 and support members 120 are arranged in the inside of the outer covering body 100.

The partition member 110 is a member which is arranged on a side of any one of the energy storage devices 200 which the unit module 11 includes. That is, the partition member 110 is a plate-like member which is arranged between two energy storage devices 200 arranged adjacent to each other, and partitions the two energy storage devices 200. In this embodiment, three partition members 110 are arranged between four energy storage devices 200. The partition members 110 are arranged so as not to be in contact with the energy storage devices 200.

The partition member 110 is a member having a heat insulation property, and is formed using a heat insulation material made of mica, for example. To be more specific, as one example of the heat insulation material for forming the partition member 110, a dammar material formed by stacking mica flakes and bonding the mica flakes to each other can be named. That is, the partition member 110 has a function of preventing the transfer of heat generated by the energy storage device 200 to the neighboring energy storage device 200.

The support member 120 constitutes a supporter which supports the partition member 110 at a predetermined position. The support member 120 is mounted and fixed to a bottom portion of the outer covering body 100, and supports the partition member 110 from below on the outer covering 14. In this embodiment, two support members 120 are arranged for one partition member 110.

The energy storage device 200 is a secondary battery (single battery) which can be charged with electricity or can discharge electricity therefrom. To be more specific, the energy storage device 200 is a non-aqueous electrolytic secondary battery such as a lithium ion secondary battery. The energy storage device 200 is arranged between two partition members 110 disposed in the inside of the outer covering body 100 or between the partition member 110 and a wall surface of the outer covering body 100, and is housed in the inside of the outer covering body 100.

The energy storage devices 200 are each provided with a safety valve 221 on an upper surface thereof. That is, each energy storage device 200 discharges a gas toward an upper side through the safety valve 221 when an internal pressure of the energy storage device 200 is elevated. The present invention is not limited to the case where all energy storage devices 200 which the unit module 11 includes are each provided with the safety valve 221, and it is sufficient that at least one energy storage device 200 is provided with the safety valve 221.

The energy storage device 200 is not limited to a non-aqueous electrolytic secondary battery, and may alternatively be a secondary battery other than a non-aqueous electrolytic secondary battery or a capacitor.

The flow path forming portion 300 is a portion which forms a flow path for a discharge through the safety valves 221 of the energy storage devices 200 in combination with the inner lid 500. That is, the flow path forming portion 300 is a flat-plate-shaped member which is arranged between the plurality of energy storage devices 200 and the inner lid 500 such that the flow path forming portion 300 strides/extends over the plurality of energy storage devices 200. The flow path forming portion 300 is arranged at a position which corresponds to the safety valves 221 of the plurality of energy storage devices 200, and guides the discharge through the safety valves 221 to the outside.

The flow path forming portion 300 also functions as a supporter which supports the partition members 110 at the predetermined positions in the same manner as the support members 120. That is, the supporter which supports the partition members 110 is constituted of two kinds of support members, that is, the support members 120 and the flow path forming portion 300, and supports the partition members 110 by pinching the partition members 110 from both upper and lower sides.

The heat insulation member 400 is a rectangular flat-plate-shaped heat insulation member which is arranged in the inside of the flow path for a discharge through the safety valves 221 of the energy storage devices 200. That is, the heat insulation member 400 is arranged in the inside of the flow path for a discharge formed by the inner lid 500 and the flow path forming portion 300. To be more specific, the heat insulation member 400 is arranged between the inner lid 500 and the flow path forming portion 300, and is arranged at the position which faces the safety valve 221 and at the position which faces the printed circuit board 700.

The heat insulation member 400 is detachably mounted on the inner lid 500. To be more specific, the heat insulation member 400 is detachably mounted on the inner lid 500 by being sandwiched between the inner lid 500 and the flow path forming portion 300. Although the heat insulation member 400 may be formed using any material provided that the heat insulation member 400 is a member having a heat insulation property, the heat insulation member 400 is a dammar member, for example.

The inner lid 500 is a flat rectangular member constituting an inner lid of the outer covering 14, and is arranged above the plurality of energy storage devices 200. The inner lid 500 is a flow path arrangement portion arranged in the flow path for a discharge through the safety valves 221 of the energy storage devices 200. To be more specific, the inner lid 500 is arranged at a position which faces the safety valves 221, and holds the printed circuit board 700. That is, the inner lid 500 is arranged between the safety valves 221 and the printed circuit board 700.

In this manner, in order to suppress the size increase of the energy storage apparatus 1 due to the arrangement of the printed circuit board 700 in a space formed between a positive terminal 230 and a negative terminal 240 of the energy storage device 200, the printed circuit board 700 is arranged above the safety valves 221 in this embodiment.

To be more specific, the inner lid 500 is arranged between a) the energy storage devices 200, the flow path forming portion 300, and the heat insulation member 400, and b) the printed circuit board 700. In this manner, the inner lid 500 is arranged on a safety valve 221 side of the energy storage devices 200 and hence, the inner lid 500 also has a function of restricting the movement of the energy storage devices 200 toward the safety valve 221 side in the inside of the outer covering body 100. That is, the inner lid 500 is fitted in the inside of the outer covering body 100 and presses the plurality of energy storage devices 200 from above, thus fixing the plurality of energy storage devices 200 to the outer covering body 100.

In this manner, the inner lid 500 forms the flow path for a discharge through the safety valves 221 of the energy storage devices 200, holds the printed circuit board 700, and further, plays a roll of fixing the energy storage devices 200 to the outer covering body 100.

In the inside of the inner lid 500, a positive external terminal 610, a negative external terminal 620, a bus bar 630, an external wiring connecting part 640, and a wiring route forming part 650 are arranged. The detailed description of these parts will be made later.

The printed circuit board 700 is electric equipment which is electrically connected to at least one energy storage device 200 out of the energy storage devices 200 which the unit module 11 includes. To be more specific, the printed circuit board 700 is a board capable of acquiring, monitoring and controlling states of the plurality of energy storage devices 200, and the printed circuit board 700 is connected to positive terminals or negative terminals of the plurality of energy storage devices 200 by wiring (lead lines).

To be more specific, the printed circuit board 700 is a control circuit board for monitoring a charge state, a discharge state (a battery state such as a voltage or a temperature) and the like of the plurality of energy storage devices 200. The printed circuit board 700 includes, for example, a control circuit (not shown in the drawings) for performing such monitoring, turning on/off of relays and the communication with other equipment.

The printed circuit board 700 is arranged on the inner lid 500, and is arranged to be covered by the lid member 800. That is, the printed circuit board 700 is arranged such that the printed circuit board 700 is protected by the inner lid 500 and the lid member 800 by being sandwiched between the inner lid 500 and the lid member 800. Further, by integrally mounting the electric components on an upper portion of the energy storage apparatus 1 in this manner, the assembling property and the maintenance property of the energy storage apparatus 1 can be enhanced.

It is not always necessary to provide the printed circuit board 700 to the respective unit modules, and the energy storage apparatus 1 may alternatively be configured such that the printed circuit board 700 is provided to only the unit module 11, for example. The unit module may also be configured such that other electric equipment such as a fuse is arranged on the inner lid 500 as electric equipment instead of the printed circuit board 700.

The lid member 800 is a member constituting a lid of the outer covering 14, and is a flat rectangular member which closes an opening of the outer covering body 100.

To be more specific, the plurality of energy storage devices 200, the flow path forming portion 300, the heat insulation member 400, the inner lid 500, the printed circuit board 700 and the like are arranged in the inside of the outer covering body 100 in this order, and an opening of the outer covering body 100 is closed by the lid member 800. By arranging the plurality of energy storage devices 200 which are heavy weight members in a lowermost portion of the unit module 11 in this manner, the stability of the unit module 11 can be enhanced.

Next, the components which the unit module 11 includes are described in detail. Firstly, the configuration of the energy storage device 200 is described in detail.

Figure 4:
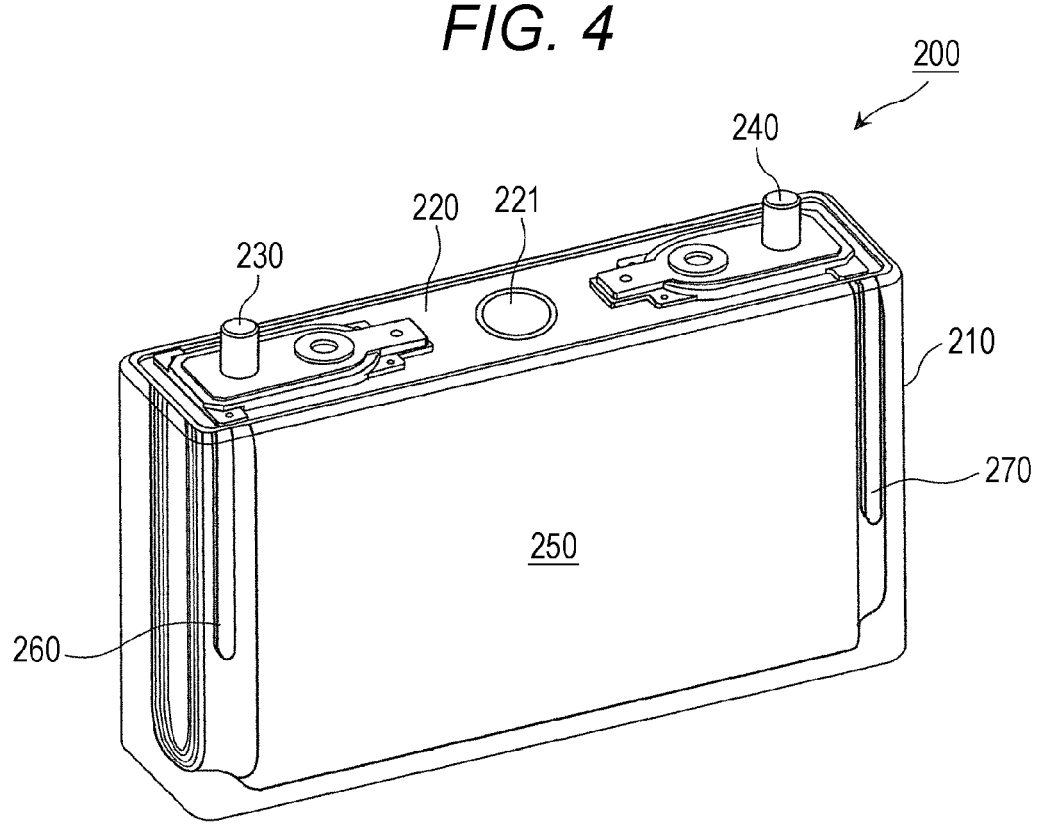
FIG. 4 shows the inside of an energy storage device in a see-through and perspective manner.
Figure 4:
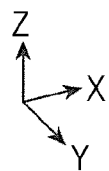

FIG. 4 shows the inside of the energy storage device 200 in a see-through and perspective manner.

As shown in the figure, the energy storage device 200 includes a container 210, the positive terminal 230 and the negative terminal 240. The container 210 includes a container lid 220 which forms an upper wall thereof. In the inside of the container 210, an electrode assembly 250, a positive current collector 260 and a negative current collector 270 are arranged. The safety valve 221 is formed on the container lid 220. A liquid such as an electrolyte solution is filled in the container 210. However, the illustration of the liquid is omitted.

The container 210 is constituted of a bottomed container body made of metal and having a rectangular cylindrical shape, and a metal made container lid 220 which closes an opening of the container body. The container 210 is formed of a sealed container by welding the container lid 220 and the container body after accommodating the electrode assembly 250 and the like in the inside of the container 210. Although a material for forming the container 210 is not particularly limited, the material for forming the container 210 may preferably be weldable metal such as stainless steel or aluminum, for example.

The electrode assembly 250 is a power generating element which includes a positive electrode, a negative electrode and a separator, and can store electricity. To be more specific, the electrode assembly 250 is an electrode assembly formed by winding, in an elliptic cylindrical shape as a whole, a layered body where the separator is sandwiched between the positive electrode and the negative electrode. Alternatively, the electrode assembly 250 may be a stacked-type electrode assembly formed by stacking plate-shaped electrode plates.

The positive electrode is an electrode plate where a positive electrode active substance layer is formed on a surface of an elongated strip-shaped conductive positive current collector foil made of aluminum, an aluminum alloy or the like. The negative electrode is an electrode plate where a negative electrode active substance layer is formed on a surface of an elongated strip-shaped conductive negative current collector foil made of copper, a copper alloy or the like. The separator is a sheet having minute pores. The positive electrode, the negative electrode and the separator which are used in the energy storage device 200 are not particularly different from positive electrodes, negative electrodes and separators used conventionally. Provided that the performance of the energy storage device 200 is not impaired, known materials can be used as desired. Provided that the performance of the energy storage device 200 is not impaired, the kind of electrolyte solution (non-aqueous electrolyte) filled in the container 210 is not particularly limited, and various electrolyte solutions can be selected.

The positive terminal 230 is an electrode terminal which is electrically connected to a positive electrode of the electrode assembly 250 by way of a positive current collector 260, and the negative terminal 240 is an electrode terminal which is electrically connected to a negative electrode of the electrode assembly 250 by way of a negative current collector 270. Both the positive terminal 230 and the negative terminal 240 are mounted on the container lid 220. The positive terminal 230 and the negative terminal 240 are metal-made electrode terminals for leading out electricity stored in the electrode assembly 250 to an external space of the energy storage device 200 and leading electricity into an inner space of the energy storage device 200 for storing electricity in the electrode assembly 250 respectively.

To be more specific, the positive terminal 230 of the energy storage device 200 arranged on a positive external terminal 610 side among the plurality of energy storage devices 200 provided to the energy storage apparatus 1 is connected to the positive external terminal 610, and the negative terminal 240 of the energy storage device 200 is connected to the positive terminal 230 of the neighboring energy storage device 200. In the same manner, the negative terminal 240 of the energy storage device 200 arranged on a negative external terminal 620 side among the plurality of energy storage devices 200 is connected to the negative external terminal 620, and the positive terminal 230 of the energy storage device 200 is connected to the negative terminal 240 of the neighboring energy storage device 200. The positive terminals 230 or the negative terminals 240 of other energy storage devices 200 are connected to the negative terminals 240 or the positive terminals 230 of the neighboring energy storage devices 200.

The positive current collector 260 is a member having conductivity and rigidity which is arranged between the positive electrode of the electrode assembly 250 and a side wall of the container 210, and is electrically connected to the positive terminal 230 and the positive electrode. The positive current collector 260 is formed using aluminum, an aluminum alloy or the like in the same manner as the positive current collector foil of the positive electrode. The negative current collector 270 is a member having conductivity and rigidity which is arranged between the negative electrode of the electrode assembly 250 and the side wall of the container 210, and is electrically connected to the negative terminal 240 and the negative electrode of the electrode assembly 250. The negative current collector 270 is formed using copper, a copper alloy or the like in the same manner as the negative current collector foil of the negative electrode.

Next, the components around the outer covering body 100 are described.

Figure 5:
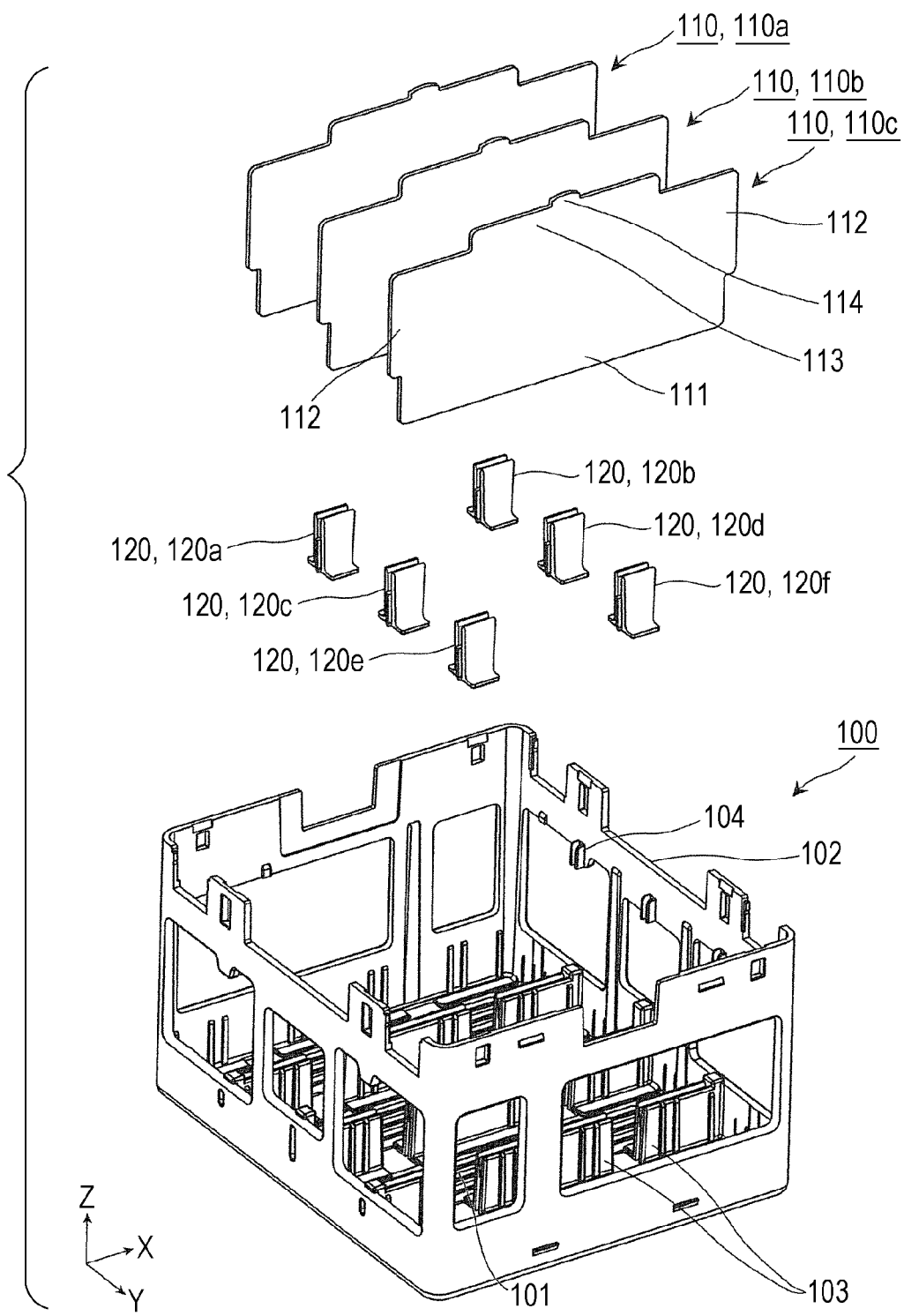
FIG. 5 shows components of the unit module according to the embodiment of the present invention around an outer covering body in an exploded and perspective manner.
Figure 6A:
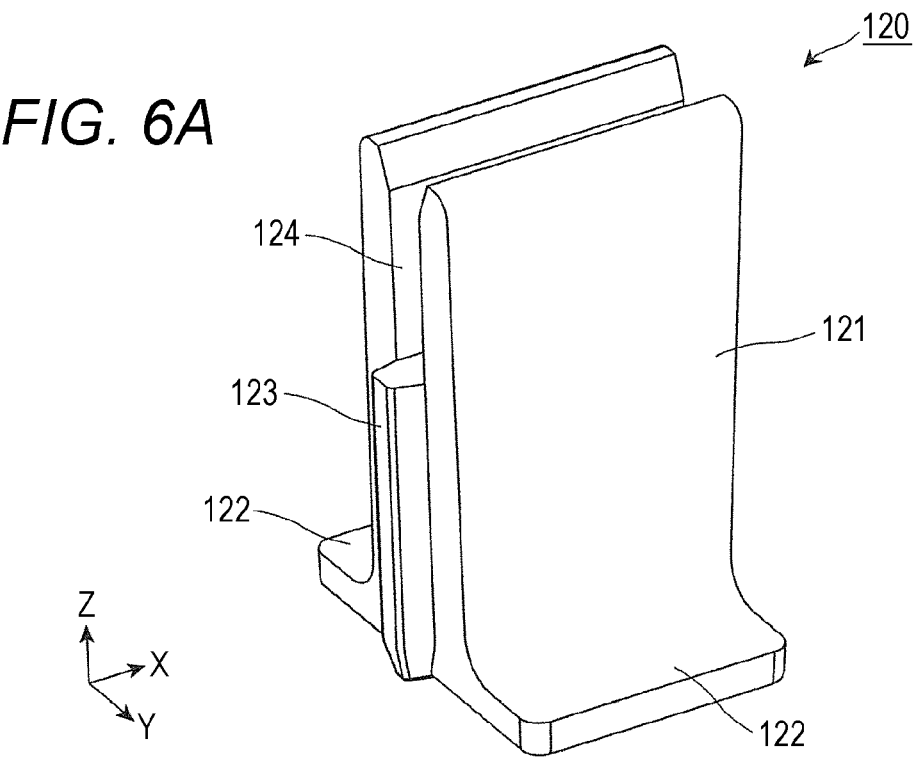
FIG. 6A shows the configuration of a support member according to the embodiment of the present invention in a perspective manner.
Figure 6B:
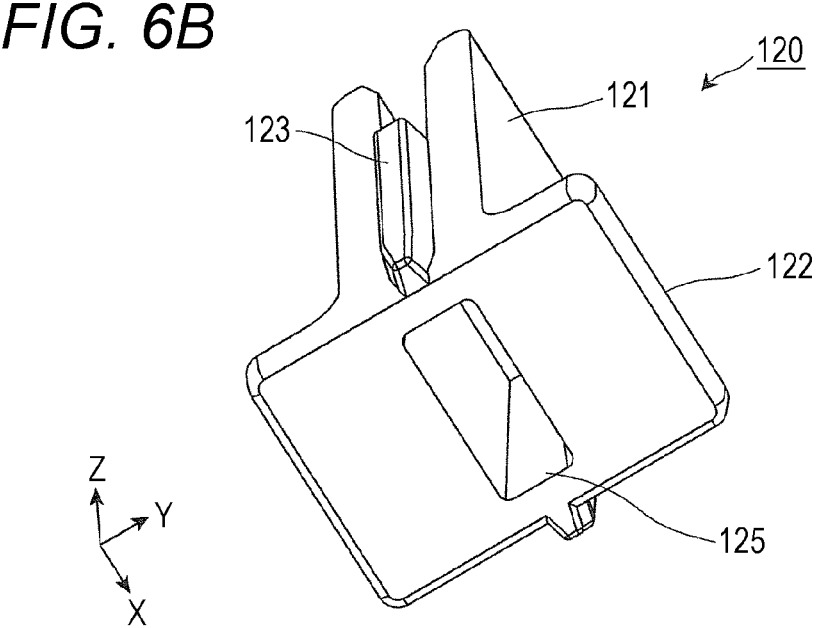
FIG. 6B shows the configuration of a support member according to the embodiment of the present invention in a perspective manner.

FIG. 5 shows components of the unit module 11 according to the embodiment of the present invention around the outer covering body 100 in an exploded and perspective manner. FIG. 6A and FIG. 6B show the configuration of the support member 120 according to the embodiment of the present invention in a perspective manner. To be more specific, FIG. 6A shows the support member 120 as viewed from an obliquely upper position in a perspective manner, and FIG. 6B shows the support member 120 as viewed from an obliquely lower position in a perspective manner.

Figure 7:
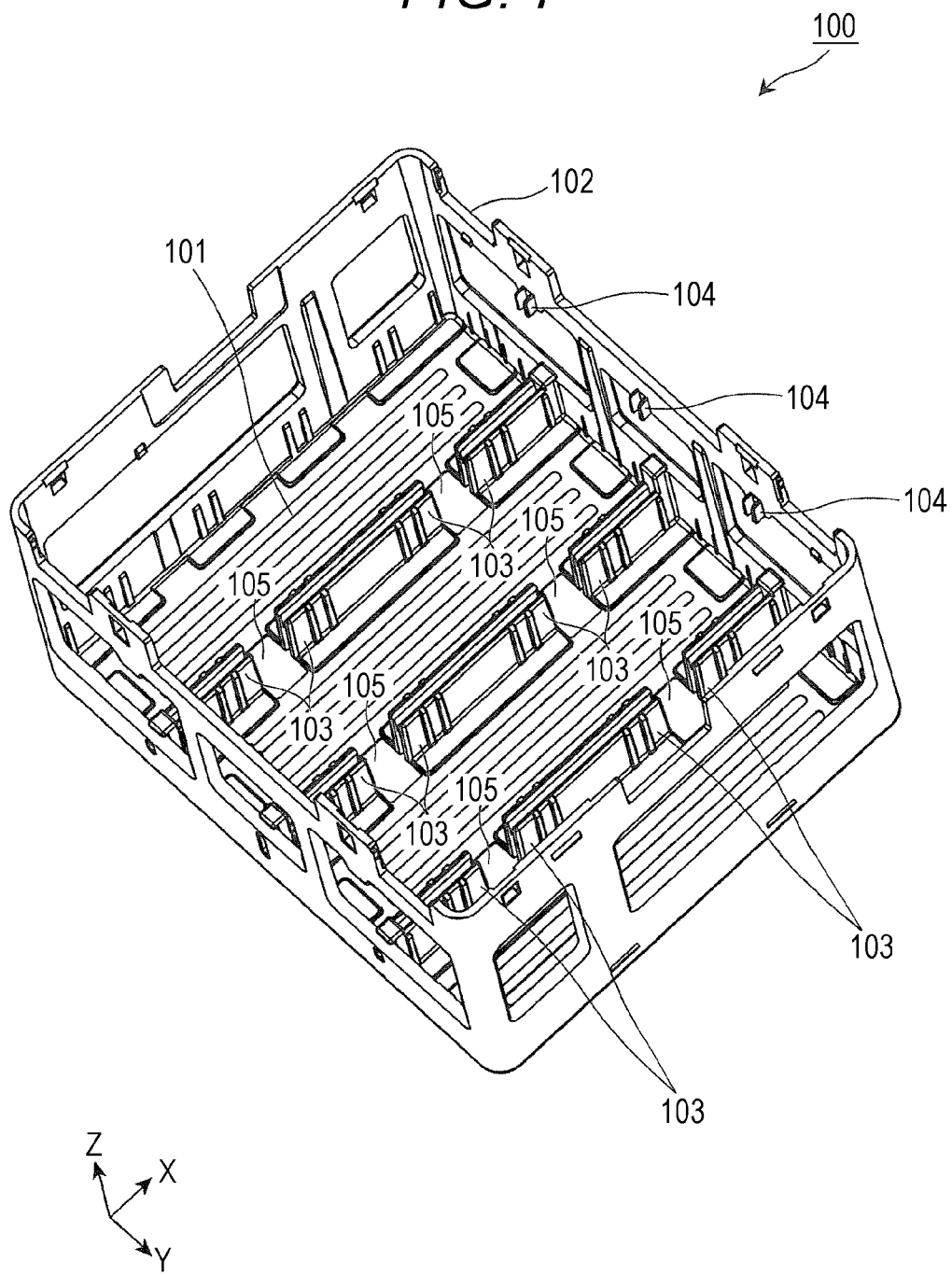
FIG. 7 shows the configuration of an outer covering body according to the embodiment of the present invention in a perspective manner.
Figure 8A:
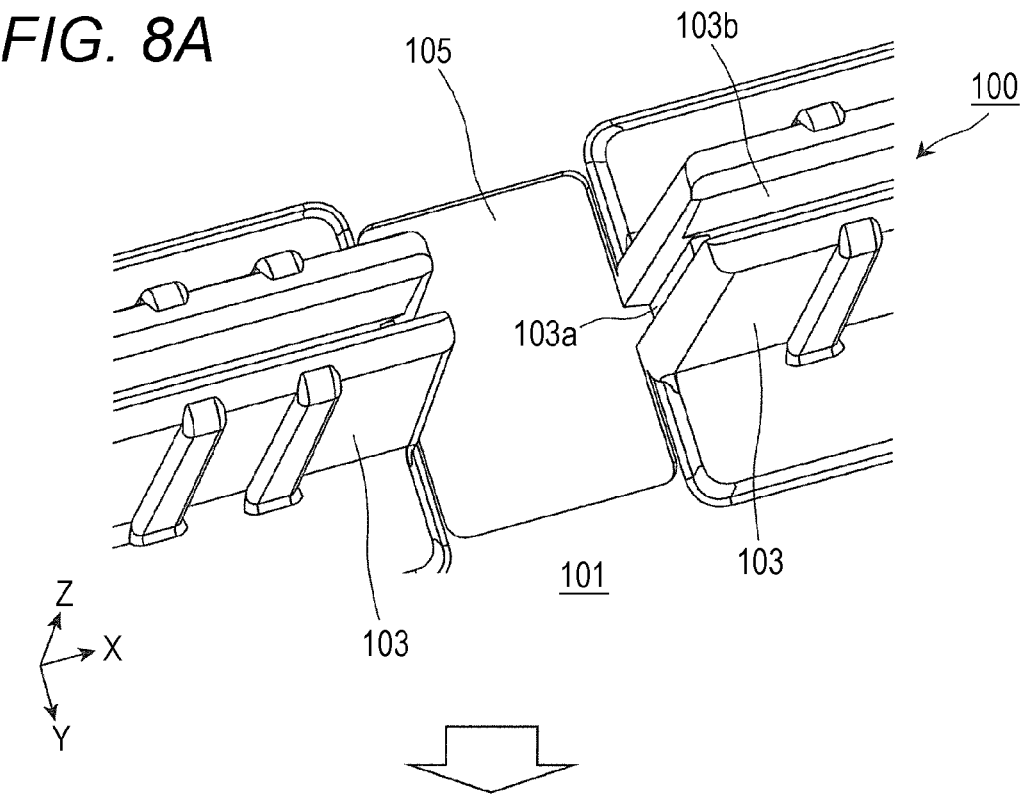
FIGS. 8A and 8B show how the support member is mounted on the outer covering body in a perspective manner.
Figure 8B:
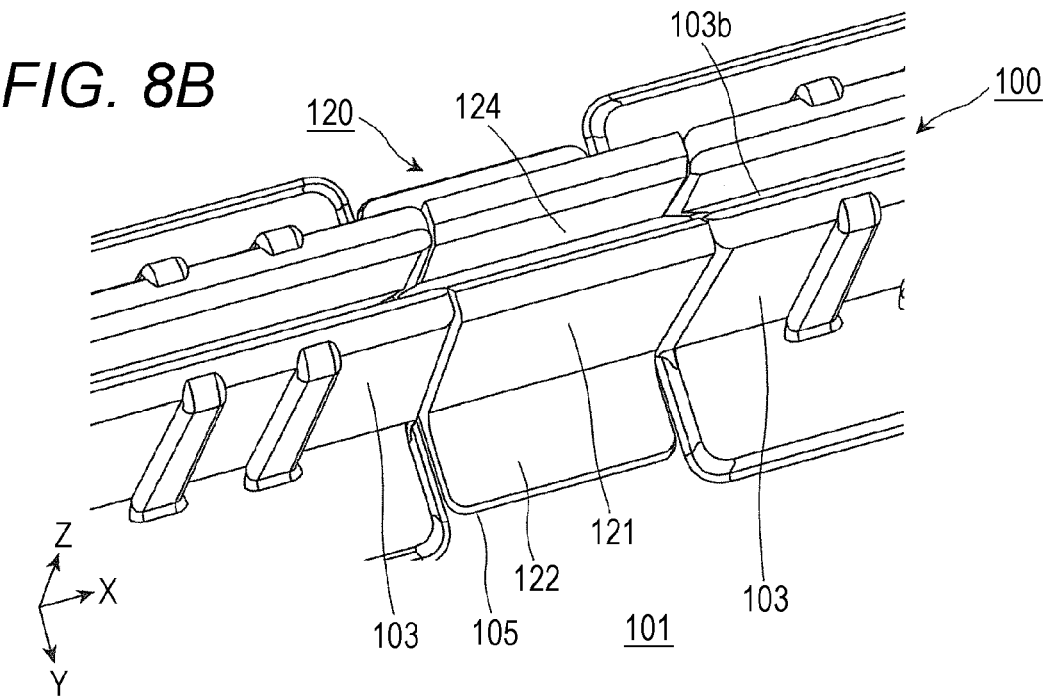

FIG. 7 shows the configuration of the outer covering body 100 according to the embodiment of the present invention in a perspective manner. FIGS. 8A and 8B show how the support member 120 is mounted on the outer covering body 100 according to the embodiment of the present invention in a perspective manner.

Firstly, as shown in FIG. 5, partition members 110a, 110b and 110c each of which is formed of a rectangular planar member are arranged in the inside of the outer covering body 100 as three partition members 110. Each of three partition members 110 (partition members 110a to 110c) has projecting portions on upper and lower sides thereof and left and right sides thereof.

To be more specific, each of three partition members 110 has a downwardly projecting portion 111 which projects downwardly, two sidewardly projecting portions 112 which project from both left and right sides (a plus side and a minus side in the X axis direction), and an upwardly projecting portion 113 which projects upwardly.

The downwardly projecting portion 111 is a rectangular projecting portion, and is inserted into regulator groove portions 103b described later which are formed on a bottom surface of the outer covering body 100 and support member groove portions 124 described later which are formed on upper portions of the support members 120.

Two sidewardly projecting portions 112 are rectangular projecting portions disposed above both ends (an end portion on the plus side and an end portion on the minus side in the X axis direction) of the downwardly projecting portion 111, and are inserted into respective groove portions of case side surface projecting portions 104 described later formed on side surfaces of the outer covering body 100.

The upwardly projecting portion 113 is a rectangular projecting portion disposed in an upwardly projecting manner between two sidewardly projecting portions 112. The upwardly projecting portion 113 forms a stair-shaped stepped portion on both sides of an upper portion of the partition member 110 together with two sidewardly projecting portions 112. By forming such stair-shaped stepped portions, a space for arranging a bus bar 630 described later on the energy storage device 200 is formed.

The upwardly projecting portion 113 has a partition member projecting portion 114 which further projects upwardly from a center portion of the upwardly projecting portion 113. The partition member projecting portion 114 is a rectangular projecting portion disposed at a center position on an upper portion of the partition member 110, and is inserted into a partition member opening 312 formed on a flow path forming portion 300 described later.

Support members 120a to 120f are disposed in the inside of the outer covering body 100 as six support members 120. These six support members 120 (support members 120a to 120f) are formed on the outer covering body 100 of the outer covering 14 in a detachable manner.

The support member 120 is formed of a heat resistant member. That is, the support member 120 is formed of a member having higher heat resistance than the outer covering body 100 of the outer covering 14. To be more specific, the support member 120 is formed of a member having higher heat resistance than a support member regulator 103 of the outer covering body 100 described later. To be more specific, the support member 120 is formed using a heat resistant resin such as a thermosetting resin. In this embodiment, the support member 120 is formed using a phenol resin.

The material for forming the support member 120 is not limited to a phenol resin, and may be a thermosetting resin such as a urea resin, a melamine resin, an unsaturated polyester resin, a diallyl phthalate resin, an epoxy resin, a silicon resin, an alkyd resin, a polyimide resin, a polyaminobismaleimide resin, a casein resin, a furan resin or a urethane resin. The support member 120 may be formed of a heat resistant member made of ceramic or the like instead of a member made of a resin.

To be more specific, as shown in FIG. 6A and FIG. 6B, six support members 120 (support members 120a to 120f) each have a support member body portion 121 and a support member fitting part 122.

The support member body portion 121 is a rectangular portion which constitutes a body of the support member 120. The support member body portion 121 has a support member projecting portion 123 on both sides thereof (the plus side and the minus side in the X axis direction). The support member groove portion 124 is formed on an upper portion of the support member body portion 121.

The support member projecting portions 123 are portions which project in both sideward directions (in the plus side direction and in the minus side direction in the X axis direction) from both side surfaces of the support member 120, and are inserted into regulator recessed portions 103a of the support member regulators 103 formed on the bottom surface of the outer covering body 100 described later. The support member groove portion 124 is a groove formed on an upper portion of the support member body portion 121, and the downwardly projecting portion 111 of the partition member 110 is inserted in the support member groove portion 124. For example, the downwardly projecting portion 111 of the partition member 110a is inserted into the support member groove portion 124 of the support member 120a and the support member groove portion 124 of the support member 120b.

The support member fitting part 122 is a rectangular portion which projects in the front-back direction (toward the plus side and the minus side in the Y axis direction) from a lower end portion of the support member body portion 121, and is fitted in a case bottom surface recessed portion 105 described later which is formed on a bottom surface of the outer covering body 100.

A space 125 is formed in the inside of the support member 120. To be more specific, the rectangular space 125 is formed in a center portion of a lower portion of the support member body portion 121 such that the space is opened in a bottom surface of the support member body portion 121.

As shown in FIG. 7, the outer covering body 100 is a bottomed rectangular cylindrical member which is formed of a case bottom surface part 101 and a case side surface part 102. An opening is formed on an upper portion of the outer covering body 100. The support members 120 and the partition members 110 are arranged in the outer covering body 100. The plurality of energy storage devices 200 are inserted and accommodated into the outer covering body 100 through the opening formed at the upper portion of the outer covering body 100.

The case bottom surface part 101 is a bottom surface part of the outer covering body 100, and is a rectangular-planar-shaped portion. The case bottom surface part 101 includes support member regulators 103 which project upward and restrict the movement of the support members 120 in the sideward direction. In this embodiment, the case bottom surface part 101 includes six pairs of support member regulators 103. That is, three sets each of which is constituted of two pairs of support member regulators 103 arranged next to each other in the X axis direction are arranged next to each other in the Y axis direction.

The support member regulator 103 is a member which is arranged adjacent to the support member 120 and is fixed to the outer covering 14 so as to restrict the movement of the support member 120 in the sideward direction. As shown in FIG. 8A, in the support member regulator 103, a regulator recessed portion 103a is formed at a position (an end portion on a plus side or an end portion on a minus side in the X axis direction) which faces a support member regulator 103 arranged adjacent to the support member regulator 103, and a regulator groove portion 103b is formed at an upper portion of the support member regulator 103.

The regulator recessed portion 103a is a groove-shaped recessed portion extending in the vertical direction and, as shown in FIG. 8B, the support member projecting portion 123 of the support member 120 is inserted into the regulator recessed portion 103a. That is, a pair of regulator recessed portions 103a which are disposed opposite to each other is formed in a pair of support member regulators 103, and the support member projecting portions 123 are inserted into the pair of regulator recessed portions 103a.

The regulator groove portion 103b is a groove-shaped recessed portion extending in the horizontal direction (X axis direction), and the downwardly projecting portion 111 of the partition member 110 is inserted into the regulator groove portion 103b. That is, the regulator groove portions 103b are connected with the support member groove portions 124 in a state where the support member 120 is arranged between each pair of regulator recessed portions 103a. Due to such a configuration, a groove portion extending in the X axis direction is formed on upper surfaces of the support member regulators 103 and upper surfaces of the support members 120, and the downwardly projecting portion 111 of the partition member 110 is inserted into the regulator groove portions 103b and the support member groove portions 124 which form the groove portion.

That is, the support member regulators 103 and the support members 120 are formed with the same height. That is, the support member regulators 103 and the support members 120 are configured such that the regulator groove portions 103b and the support member groove portion 124 are arranged at the same height and are connected to each other in a state that the support member 120 is arranged between the pair of regulator recessed portions 103a.

In this embodiment, the support member regulators 103 are integrally formed with the case bottom surface part 101. However, the support member regulators 103 may be formed as bodies separate from the case bottom surface part 101 and may be fixed to the case bottom surface part 101.

As shown in FIG. 7 and FIGS. 8A and 8B, the case bottom surface recessed portion 105 is disposed between the pair of support member regulators 103. The case bottom surface recessed portion 105 is a rectangular recessed portion formed on the case bottom surface part 101 between the pair of support member regulators 103, and the support member fitting part 122 of the support member 120 is fitted in the case bottom surface recessed portion 105.

That is, the support member fitting part 122 is fitted in the case bottom surface recessed portion 105 in a state where the support member 120 is arranged between the pair of regulator recessed portions 103a so that the support member fitting part 122 is fitted in the case bottom surface recessed portion 105. In this manner, the support members 120 are detachably mounted on the case bottom surface part 101.

Further, as shown in FIG. 7, the case side surface part 102 is a quadrangular-cylindrical-shaped portion formed of four rectangular flat-plate-shaped side surface parts which cover four sides of the case bottom surface part 101. To discharge heat generated by the energy storage devices 200 to the outside of the outer covering body 100, a plurality of rectangular openings are annularly formed on the case side surface part 102 along an inner periphery of the case side surface part 102.

The case side surface part 102 includes six case side surface projecting portions 104 which support upper portions of three partition members 110. The case side surface projecting portion 104 is a projecting portion which projects inwardly from an upper portion of the case side surface part 102. The pair of case side surface projecting portions 104 is arranged for one partition member 110 such that each of three partition members 110 is pinched by the pair of case side surface projecting portions 104 from both sides.

In this embodiment, a groove portion is formed on the case side surface projecting portion 104, and the sidewardly projecting portion 112 of the partition member 110 is inserted into the groove portion. That is, the sidewardly projecting portions 112 formed on both sides of the partition member 110 are inserted into the groove portions formed in the pair of case side surface projecting portions 104 which are formed opposite to each other.

Next, the flow path forming portion 300 is described in detail.

Figure 9A:
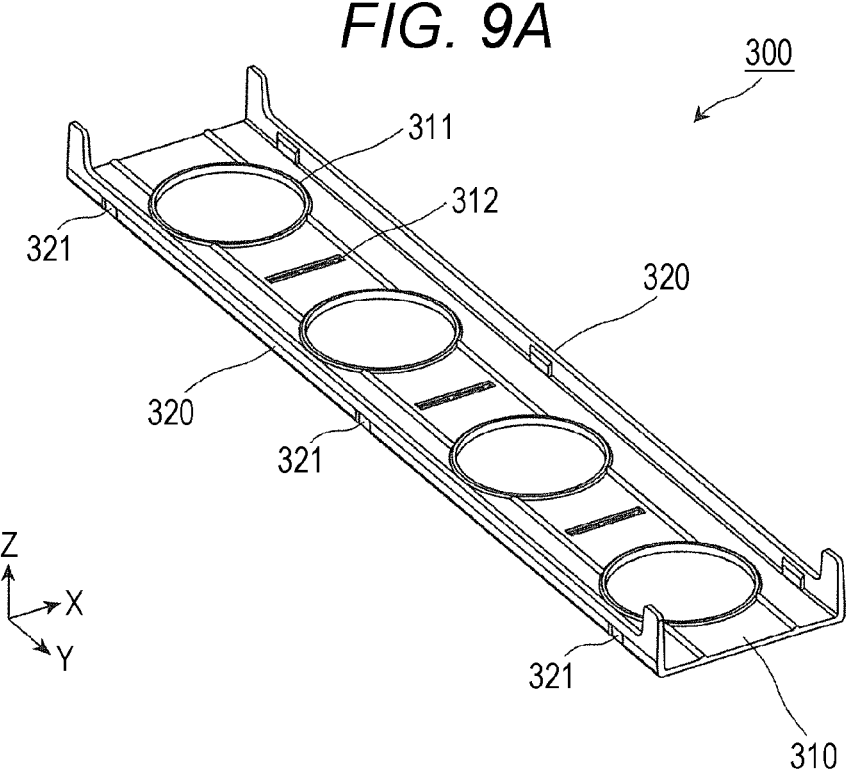
FIG. 9A shows the configuration of a flow path forming portion according to the embodiment of the present invention in a perspective manner.
Figure 9B:
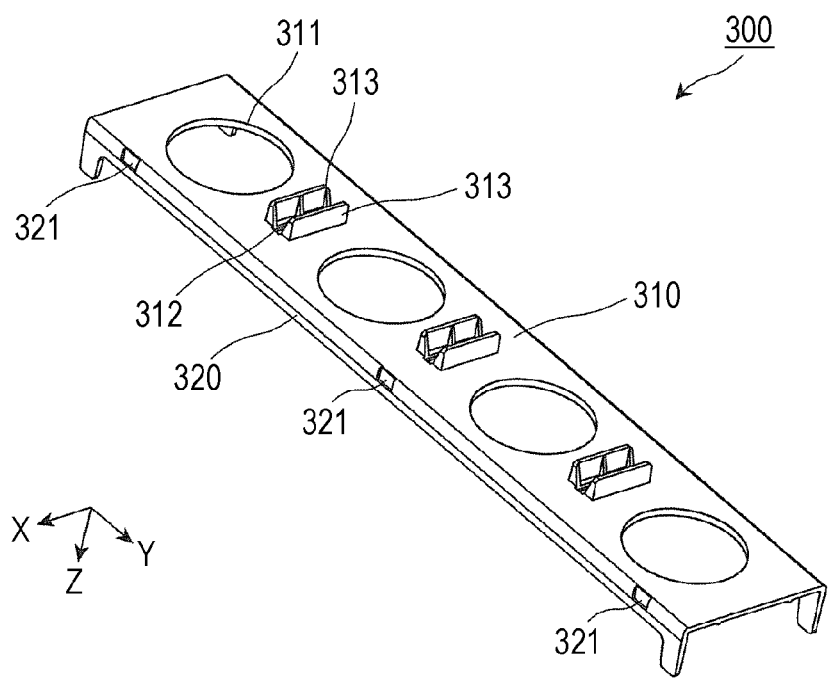
FIG. 9B shows the configuration of a flow path forming portion according to the embodiment of the present invention in a perspective manner.
Figure 10:
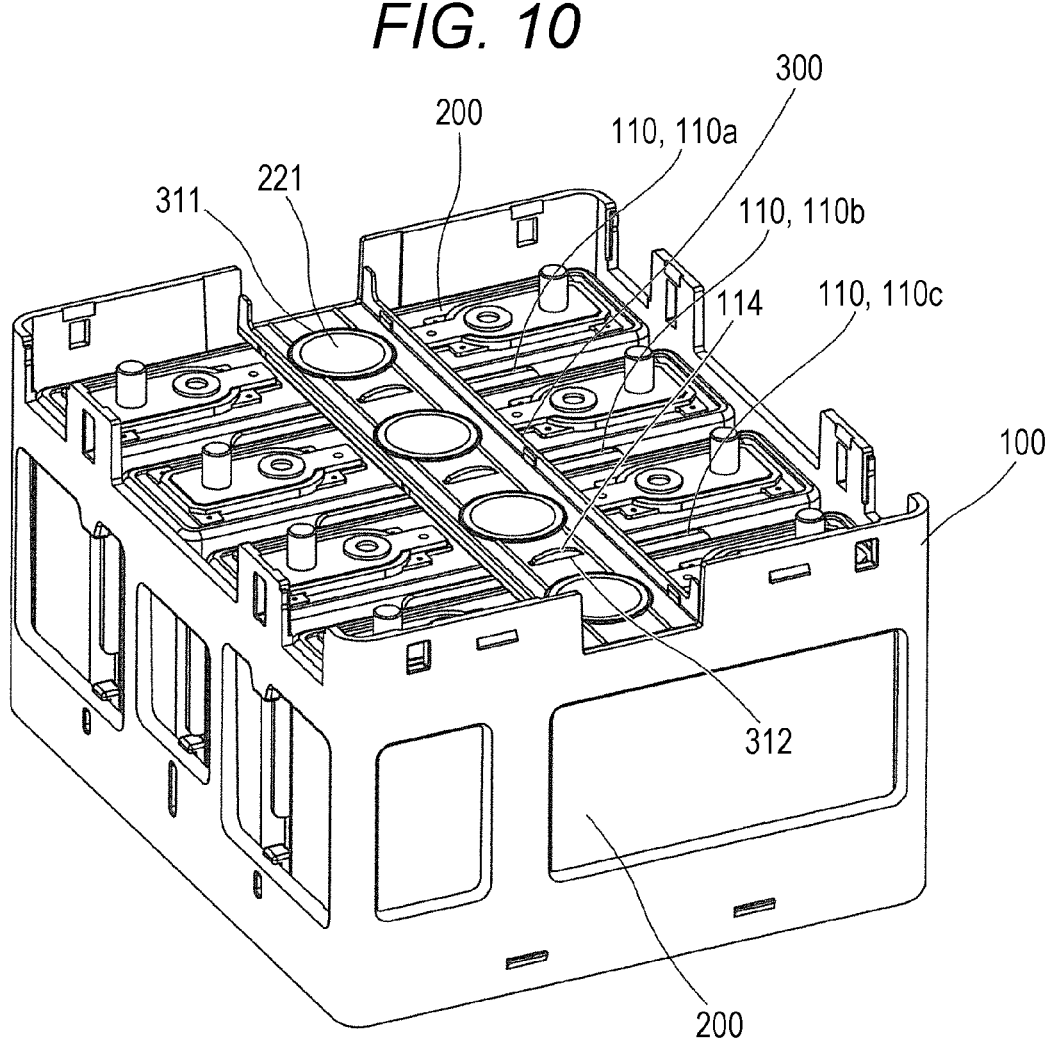
FIG. 10 shows the configuration where the flow path forming portion according to the embodiment of the present invention is arranged on the energy storage devices and partition members in a perspective manner.
Figure 10:
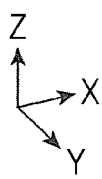

FIG. 9A and FIG. 9B show the configuration of the flow path forming portion 300 according to the embodiment of the present invention in a perspective manner. To be more specific, FIG. 9A shows the configuration of the flow path forming portion 300 as viewed from above in a perspective manner, and FIG. 9B shows the configuration of the flow path forming portion 300 as viewed from below in a perspective manner. FIG. 10 shows the configuration where the flow path forming portion 300 according to the embodiment of the present invention is arranged on the energy storage devices 200 and the partition members 110 in a perspective manner.

The flow path forming portion 300 is a member which forms a flow path for a discharge through the safety valves 221 of the energy storage devices 200, and supports the partition members 110 on the outer covering 14 at predetermined positions. The flow path forming portion 300 is formed of a heat resistant member in the same manner as the support members 120. That is, the flow path forming portion 300 is formed of a member which has higher heat resistance than the outer covering body 100 of the outer covering 14. To be more specific, the flow path forming portion 300 is formed using a heat resistant resin such as a thermosetting resin. In this embodiment, the flow path forming portion 300 is formed using a phenol resin.

A material for forming the flow path forming portion 300 is not limited to a phenol resin in the same manner as the support member 120. That is, the material for forming the flow path forming portion 300 may be a thermosetting resin such as a urea resin, a melamine resin, an unsaturated polyester resin, a diallyl phthalate resin, an epoxy resin, a silicon resin, an alkyd resin, a polyimide resin, a polyamino-bismaleimide resin, a casein resin, a furan resin or a urethane resin. The flow path forming portion 300 may be formed of a heat resistant member made of ceramic instead of a member made of a resin.

As shown in FIG. 9A and FIG. 9B, the flow path forming portion 300 includes a plate-shaped flow path forming bottom surface part 310, and two flow path forming portion side surface parts 320 which project upwardly from both side surfaces of the flow path forming bottom surface part 310 respectively.

Safety valve openings 311 and partition member openings 312 are formed in the flow path forming bottom surface part 310, wherein the safety valve openings 311 are arranged at positions which face the safety valves 221 of the energy storage devices 200, and the partition member openings 312 are arranged at positions which correspond to the upwardly projecting portions 113 of the partition members 110. The flow path forming bottom surface part 310 includes a pair of partition member side projecting portions 313 on a side of each partition member opening 312.

That is, as shown in FIG. 10, four safety valve openings 311 are formed in the flow path forming bottom surface part 310 corresponding to the safety valves 221 of four energy storage devices 200. Further, three partition member openings 312 and three pairs of partition member side projecting portions 313 are formed on the flow path forming bottom surface part 310 corresponding to three partition members 110. The energy storage devices 200 are accommodated in the inside of the outer covering body 100 in a state where the safety valves 221 face upward, and the flow path forming portion 300 is arranged above the energy storage devices 200.

The safety valve opening 311 is a through hole having a circular shape larger than the safety valve 221 of the energy storage device 200. When a gas is discharged through the safety valve 221, the safety valve openings 311 make the gas pass through the flow path forming bottom surface part 310 toward an upper side of the flow path forming bottom surface part 310 from a lower side of the flow path forming bottom surface part 310.

The partition member opening 312 is an elongated through hole, and the partition member projecting portion 114 of the partition member 110 is inserted into the partition member opening 312. That is, the partition member projecting portions 114 of the partition members 110 are inserted into the partition member openings 312 so that the flow path forming portion 300 supports upper end portions of the partition members 110. The partition member opening 312 is not necessarily the elongated through hole, and may be a notched portion, a recessed portion or the like.

The pair of partition member side projecting portions 313 is a pair of projecting portions which projects downwardly from the flow path forming bottom surface part 310, and is formed such that the pair of partition member side projecting portions 313 pinches the partition member opening 312 therebetween. That is, the pair of partition member side projecting portions 313 is arranged so as to pinch the upper end portion of the partition member 110 inserted into the partition member opening 312. Due to such a configuration, the flow path forming portion 300 can support the upper end portions of the partition members 110 also by the partition member side projecting portions 313.

In this manner, the supporter which supports the partition member 110 is constituted of plural support members, that is, two support members 120, two case side surface projecting portions 104 and the flow path forming portion 300. The supporter supports the partition member 110 by pinching the partition member 110 from the upper and lower sides as well as from the left and right sides. Further, the supporter which supports the partition members 110 is arranged at positions where the supporter supports the partition member 110b arranged at the center position of the outer covering 14, and supports the partition members 110a and 110c disposed on both sides (the minus side and the plus side in the Y axis direction) of the partition member 110b.

The flow path forming portion side surface parts 320 are elongated portions which extend along side surfaces of the flow path forming bottom surface part 310 and project upward. Each flow path forming portion side surface part 320 has second fitting parts 321 into which first fitting parts 550 described later of the inner lid 500 are fitted. That is, each flow path forming portion side surface part 320 includes three second fitting parts 321 corresponding to the first fitting parts 550 formed on the inner lid 500.

In this embodiment, the second fitting part 321 has a recessed shape corresponding to a projecting shape of the first fitting part 550. A shape of the second fitting part 321 is not limited to the recessed shape, and may be any shape provided that the shape of the second fitting part 321 conforms to the shape of the first fitting part 550.

Next, the components around the inner lid 500 are described.

Figure 11:
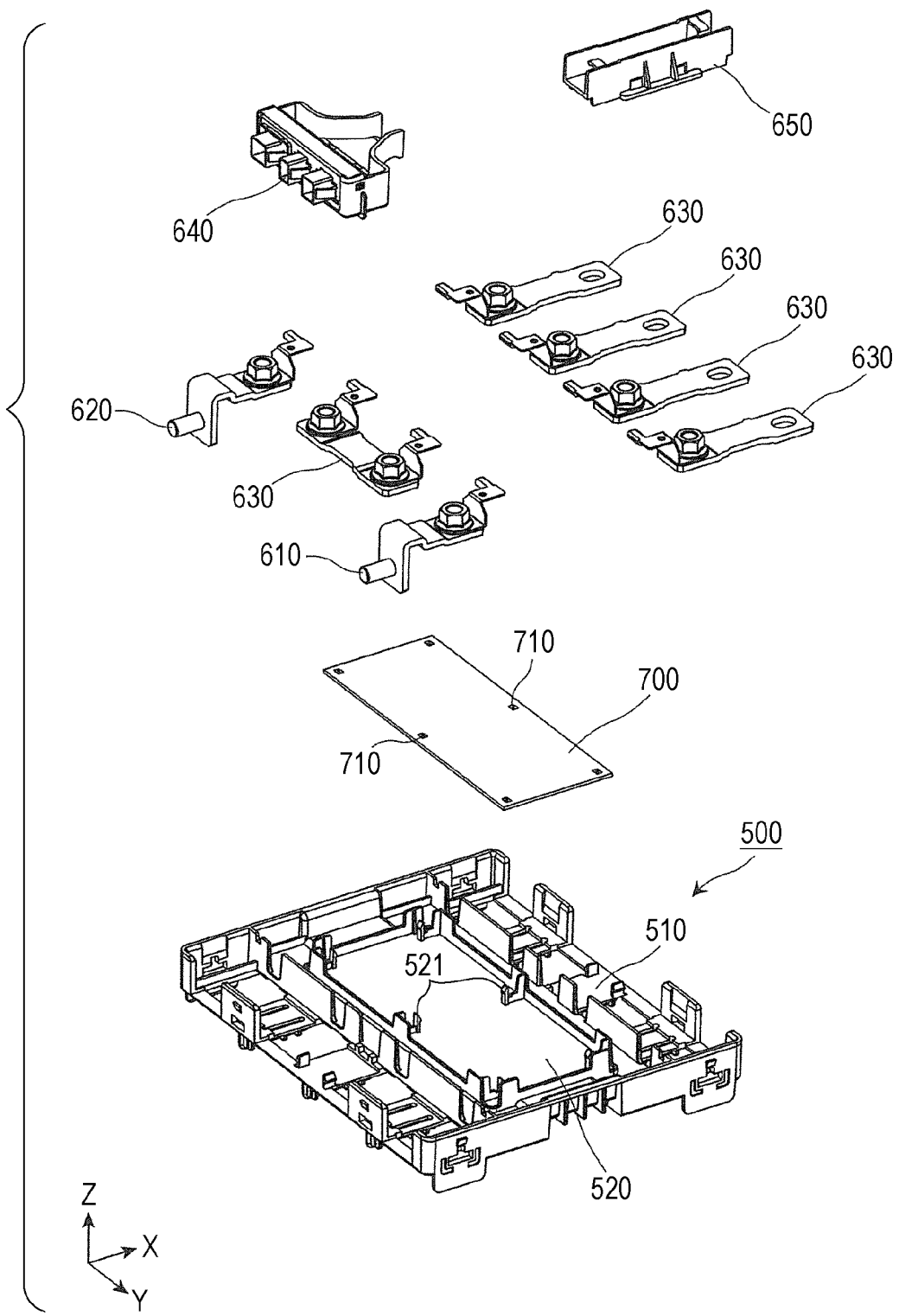
FIG. 11 shows components of the unit module according to the embodiment of the present invention around an inner lid in an exploded and perspective manner.
Figure 12:
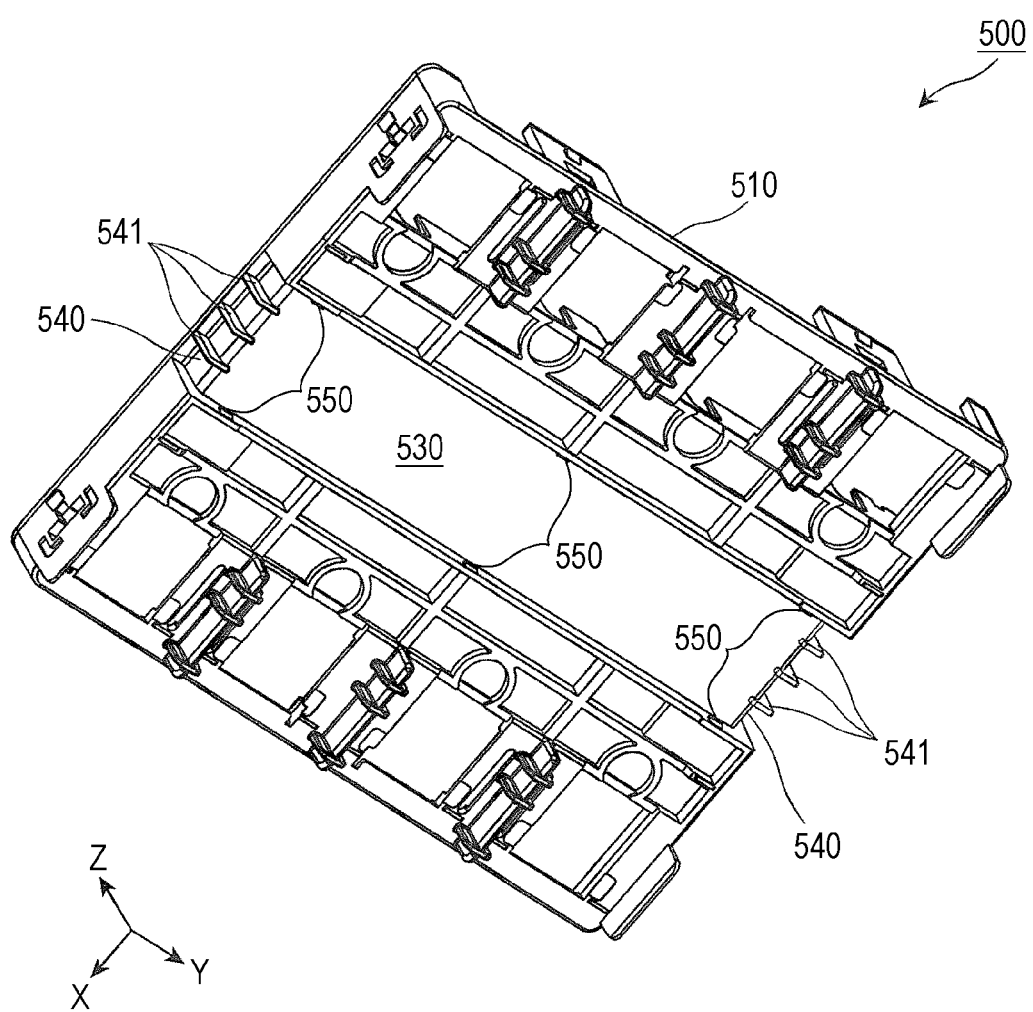
FIG. 12 shows the configuration of the inner lid according to the embodiment of the present invention in a perspective manner.

FIG. 11 shows components of the unit module 11 according to the embodiment of the present invention around the inner lid 500 in an exploded and perspective manner. FIG. 12 shows the configuration of the inner lid 500 according to the embodiment of the present invention in a perspective manner. To be more specific, FIG. 12 shows the configuration of the inner lid 500 as viewed from below in a perspective manner.

Figure 13:
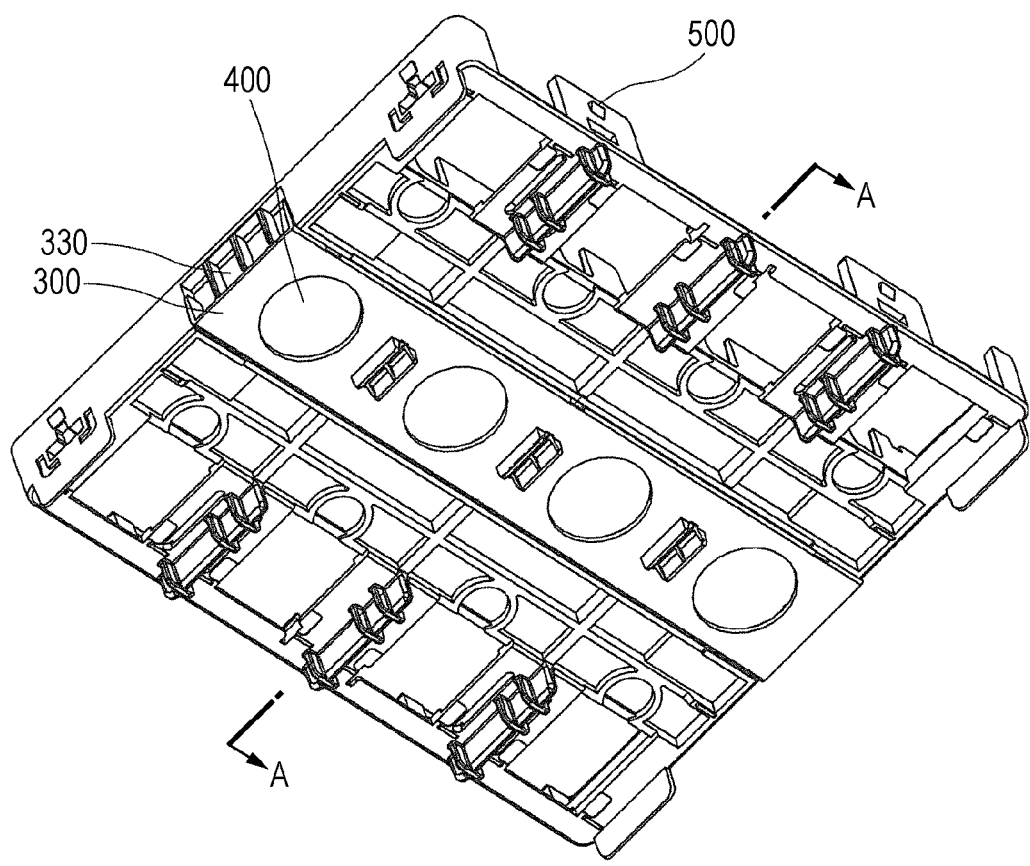
FIG. 13 shows a state where a heat insulating member and the flow path forming portion are mounted on the inner lid according to the embodiment of the present invention in a perspective manner.
Figure 14:
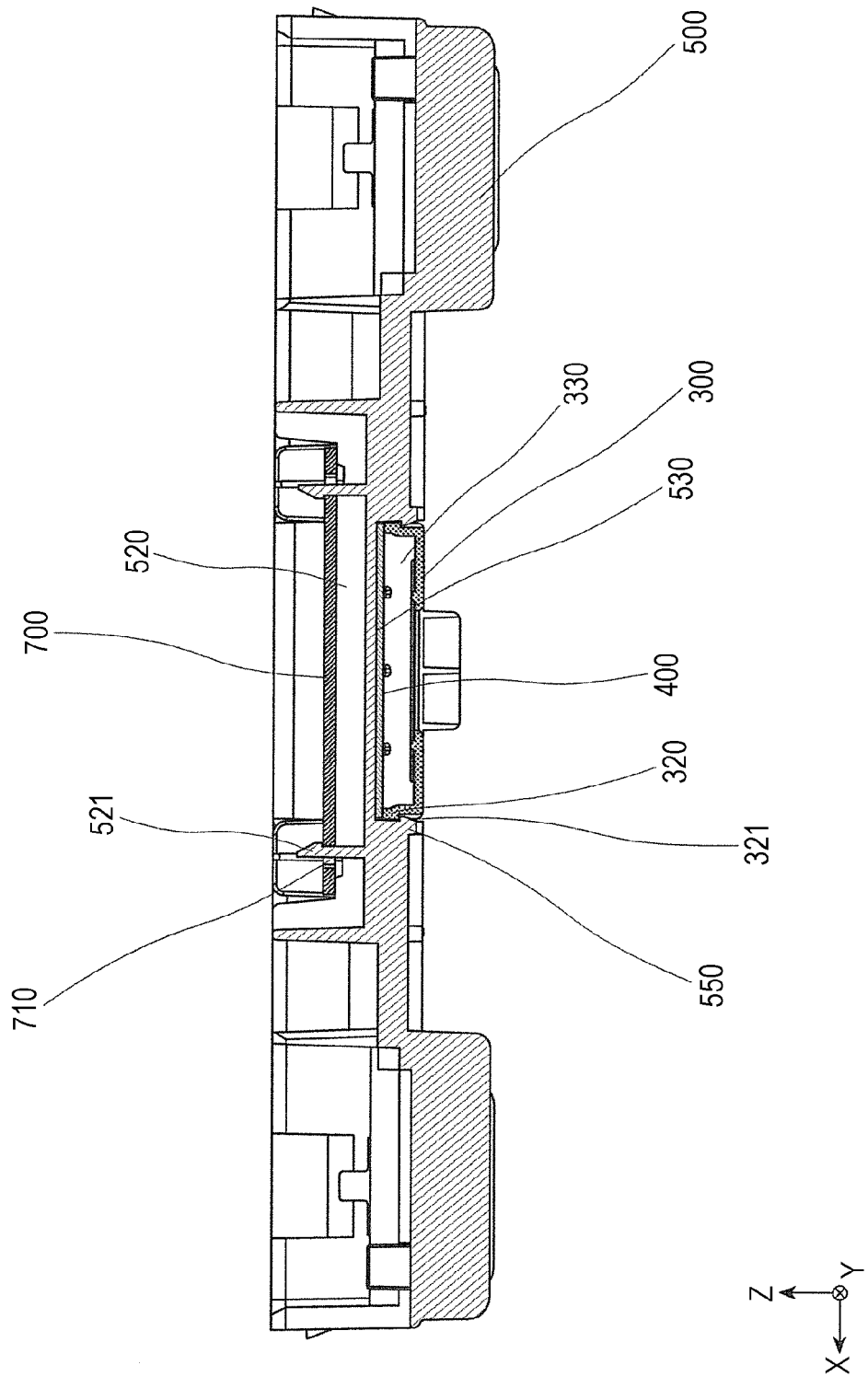
FIG. 14 shows a cross section of the inner lid according to the embodiment of the present invention in a state where the heat insulation member and the flow path forming portion are mounted on the inner lid.

FIG. 13 shows a state where the heat insulation member 400 and the flow path forming portion 300 are mounted on the inner lid 500 according to the embodiment of the present invention in a perspective manner. FIG. 14 shows a cross section of the state where the heat insulation member 400 and the flow path forming portion 300 are mounted on the inner lid 500 according to the embodiment of the present invention. To be more specific, FIG. 14 shows the cross section of the configuration shown in FIG. 13 taken along line A-A.

Figure 15:
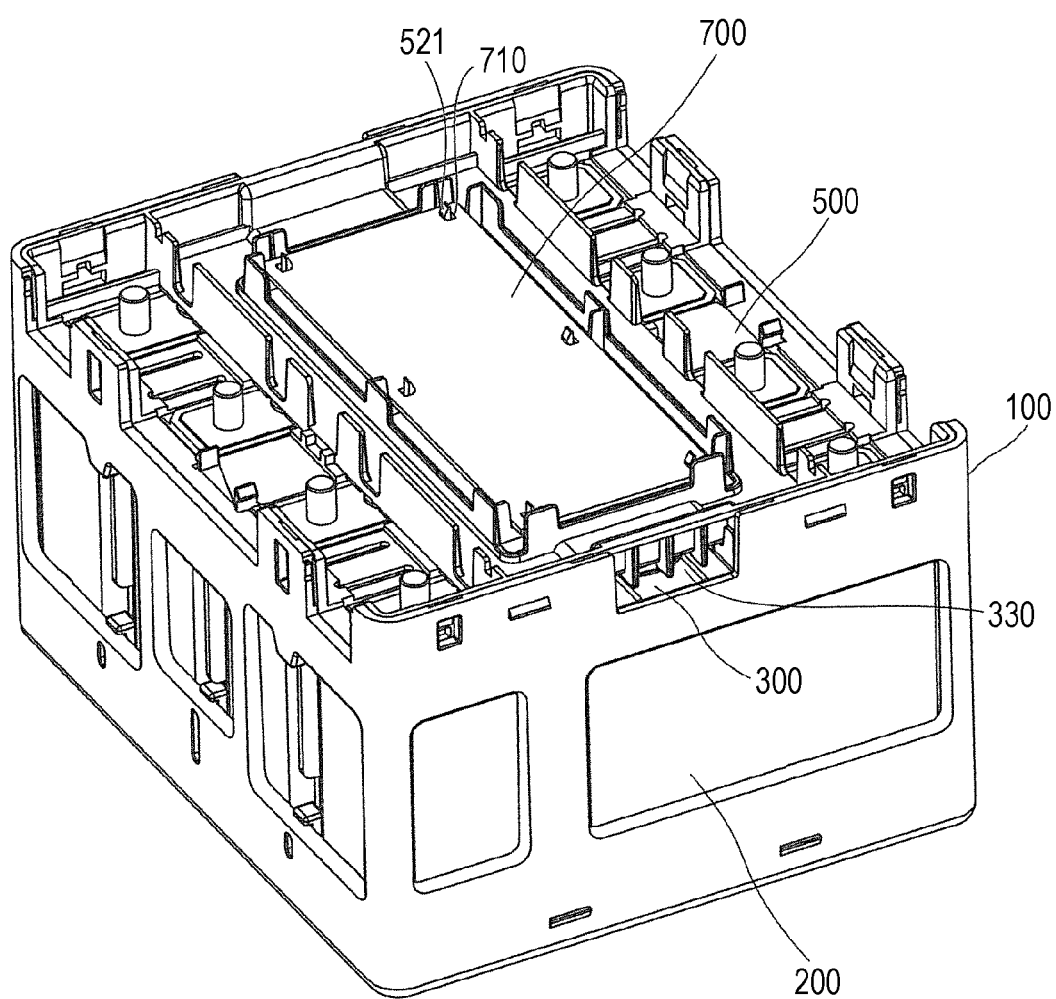
FIG. 15 shows a state where the inner lid according to the embodiment of the present invention is mounted on the outer covering body in a perspective manner.

FIG. 15 shows a state where the inner lid 500 according to the embodiment of the present invention is mounted on the outer covering body 100 in a perspective manner.

Firstly, as shown in FIG. 11, the positive external terminal 610, the negative external terminal 620, the bus bars 630, the external wiring connecting part 640, and the wiring route forming part 650 are arranged on the inner lid 500 besides the printed circuit board 700.

The positive external terminal 610 is an external terminal on a positive electrode side arranged in the inside of the positive external terminal cover 11a shown in FIG. 2, and the negative external terminal 620 is an external terminal on a negative electrode side arranged in the inside of the negative external terminal cover 11b shown in FIG. 2. The positive external terminal 610 and the negative external terminal 620 are electrode terminals used for charging the energy storage apparatus 1 with electricity from the outside and for discharging electricity to the outside from the energy storage apparatus 1. That is, the energy storage apparatus 1 is charged with electricity from the outside and discharges electricity to the outside therefrom through the positive external terminal 610 and the negative external terminal 620.

The bus bar 630 is a member which is arranged on the inner lid 500. The bus bar 630 is a conductive member made of metal or the like, and electrically connects the plurality of energy storage devices 200 to each other. To be more specific, in the energy storage devices 200 arranged adjacent to each other, the bus bar 630 connects the positive terminal or the negative terminal of one energy storage device 200 and the negative terminal or the positive terminal of another energy storage device 200.

The external wiring connecting part 640 is a connector connected to external wiring, and connects the external wiring and wiring which is connected to at least one energy storage device 200 out of the plurality of energy storage devices 200.

The wiring route forming part 650 is a member which is arranged between two unit modules so as to straddle between the two unit modules, and forms a wiring path which allows wiring which straddles between two unit modules to pass therethrough.

Next, the inner lid 500 is described in detail.

The inner lid 500 has an inner lid body portion 510 on which the bus bar 630 and the like are arranged. The inner lid 500 has a flat planar board mounting portion 520 on which the printed circuit board 700 is mounted at a center position of the inner lid body portion 510, and also has board supporters 521 which constitute projecting portions projecting from the board mounting portion 520.

To be more specific, as shown in FIG. 14 and FIG. 15, the board supporters 521 are inserted into board openings 710 formed in the printed circuit board 700, and the printed circuit board 700 is mounted on the board mounting portion 520 so that the printed circuit board 700 is fixed onto the inner lid 500. In this embodiment, the inner lid 500 has six board supporters 521, and the printed circuit board 700 is fixed onto the inner lid 500 by inserting the six board supporters 521 into six board openings 710 formed in the printed circuit board 700.

Although the printed circuit board opening 710 is a circular through hole formed in an outer periphery of the printed circuit board 700 in this embodiment, the printed circuit board opening 710 may be a notched portion, a recessed portion or the like. The number of board openings 710 is not limited, and the number of board supporters 521 is also not limited.

As shown in FIG. 12, the inner lid 500 has a flat portion 530 and inclined portions 540 inclined with respect to the flat portion 530 on a surface thereof on a side opposite to the board mounting portion 520 of the inner lid body portion 510. The flat portion 530 is a flat surface on which the heat insulation member 400 is mounted, and the inclined portion 540 is an inclined surface arranged on both sides of the flat portion 530. That is, the heat insulation member 400 is disposed within the flat portion 530, and the inner lid 500 has the flat portion 530 and the inclined portions 540 on a surface thereof which faces the heat insulation member 400. Due to such a configuration, a discharge through the safety valves 221 of the energy storage devices 200 is discharged in the oblique upward direction through the inclined portions 540.

Further, a heat insulation member regulator 541 which restricts the movement of the heat insulation member 400 is disposed on each inclined portion 540. To be more specific, the heat insulation member regulator 541 is formed of portions which project from the inclined portion 540. By arranging two heat insulation member regulators 541 such that the heat insulation member regulators 541 pinch the heat insulation member 400 from both sides in the Y axis direction, the heat insulation member regulators 541 restrict the movement of the heat insulation member 400 in the Y axis direction. The heat insulation member regulators 541 also have a function of reinforcing the strength of the inner lid 500.

The inner lid 500 includes the first fitting parts 550 which are fitted in the second fitting parts 321 formed on the flow path forming portion 300. The first fitting parts 550 are portions having a projection shape which are formed on both sides of the flat portion 530, and are fitted in the second fitting parts 321 having a recessed shape.

To be more specific, as shown in FIG. 13 and FIG. 14, the heat insulation member 400 is disposed on the flat portion 530 of the inner lid 500, and the flow path forming portion 300 is arranged below the heat insulation member 400 such that the heat insulation member 400 is sandwiched by the flat portion 530 and the flow path forming portion 300. By engaging the first fitting parts 550 of the inner lid 500 and the second fitting parts 321 formed in the flow path forming portion 300 with each other by fitting engagement, the flow path forming portion 300 is mounted on the inner lid 500.

In this manner, the heat insulation member 400 is sandwiched by the inner lid 500 and the flow path forming portion 300 and hence, the heat insulation member 400 is detachably mounted on the inner lid 500.

By mounting the heat insulation member 400 and the flow path forming portion 300 on the inner lid 500 as described above, the flow path 330 for a discharge through the safety valves 221 of the energy storage devices 200 shown in FIG. 13 to FIG. 15 is formed.

In an attempt to discharge a discharge through the safety valves 221 toward the outside of the energy storage apparatus 1 (unit module), to prevent the discharge from adversely affecting the printed circuit board 700 by heat or the like, it is necessary to prevent the discharge from passing through the space where the printed circuit board 700 is arranged. That is, it is necessary to dispose the flow path 330 for a discharge below the space where the printed circuit board 700 is arranged. Further, the plurality of energy storage devices 200 are arranged next to each other in the Y axis direction, and each energy storage device 200 has the positive terminal 230 and the negative terminal 240 which are arranged in the X axis direction. That is, the space formed between the positive terminals 230 and the negative terminals 240 of the plurality of energy storage devices 200 extends in the Y axis direction. Accordingly, by forming the flow path 330 for a discharge along the Y axis direction, the configuration is realized where the printed circuit board 700 can be arranged by effectively making use of the space formed between the positive terminals 230 and the negative terminals 240, and the printed circuit board 700 is not adversely affected by a discharge through the safety valves 221. Further, the flow path 330 for a discharge is formed so as to extend along the Y axis direction and hence, a discharge port for a discharge is formed on a side surface of the energy storage apparatus 1 (unit module) on a Y axis direction side.

Further, as shown in FIG. 15, the inner lid 500 is arranged so as to cover a surface of the printed circuit board 700 on a safety valve 221 side and hence, the inner lid 500 also has a function of protecting the printed circuit board 700 from a discharge through the safety valves 221.

As has been described above, the energy storage apparatus 1 according to the embodiment of the present invention includes the supporters (the support members 120 or the flow path forming portion 300) which support the partition members 110 arranged on sides of the energy storage devices 200 at predetermined positions, and the supporter is formed of a heat resistant member. That is, the supporter which supports the partition member 110 is formed of a heat resistant member and hence, irrespective of a material used for forming the partition member 110, the deformation of the supporter due to heat can be prevented. Accordingly, even when the energy storage device 200 is overheated to a high temperature, the supporter having heat resistance can continuously support the partition member 110 on the outer covering 14 at the predetermined position and hence, the deformation of the whole shape of the energy storage apparatus 1 can be prevented.

That is, when the partition member 110 which is not in contact with the energy storage device 200 in a normal state falls down at the time of high temperature and is brought into contact with the energy storage device 200, heat of the partition member 110 is transferred to the energy storage device 200. Due to such transfer of heat, an abnormal state is generated in the energy storage device 200. According to the energy storage apparatus 1, the supporter can prevent the occurrence of such a defect brought about by the contact of the partition member 110 to the energy storage device 200.

The supporter is formed using a material having higher heat resistance than the outer covering 14 and hence, even when the energy storage device 200 is overheated to a high temperature, the supporter can continuously support the partition member 110 at the predetermined position.

The energy storage apparatus 1 includes the support member regulators 103 which regulate the movement of the support members 120 in a sideward direction, and the support member 120 is formed using a member having higher heat resistance than the support member regulator 103. Accordingly, the support members 120 can be stably fixed to the outer covering 14 by the support member regulators 103 and, at the same time, even when the energy storage device 200 is overheated to a high temperature, the support members 120 can continuously support the partition members 110 at the predetermined positions.

The supporter supports the partition member 110 using two or more kinds of support members, that is, two support members and the flow path forming portion 300 and hence, the supporter can continuously support the partition member 110 in a stable manner. Accordingly, even when the energy storage device 200 is overheated to a high temperature in the energy storage apparatus 1, the deformation of the whole shape of the energy storage apparatus 1 can be further prevented.

The support members 120 and the flow path forming portion 300 pinch the partition member 110 from both sides and hence, the support members 120 and the flow path forming portion 300 can continuously support the partition member 110 in a stable manner. Accordingly, even when the energy storage device 200 is overheated to a high temperature in the energy storage apparatus 1, the deformation of the whole shape of the energy storage apparatus 1 can be further prevented.

The support members 120 are fitted in the recessed portions formed in the outer covering 14 and hence, the support members 120 are arranged on the outer covering 14 in a stable manner. Accordingly, the support members 120 can continuously support the partition members 110 in a stable manner and hence, even when the energy storage device 200 is overheated to a high temperature, the deformation of the whole shape of the energy storage apparatus 1 can be further prevented.

A space is formed in the inside of the support member 120 and hence, a heat insulating property of the support member 120 can be enhanced because of the space.

The support members 120 and the flow path forming portion 300 are arranged at least at the center position of the energy storage apparatus 1. The temperature of the energy storage apparatus 1 is likely to be highest at the center position of the energy storage apparatus 1. Accordingly, by arranging the support members 120 and the flow path forming portion 300 at the center position of the energy storage apparatus 1 where the temperature of the energy storage apparatus 1 is likely to be highest, the deformation of the shape of the energy storage apparatus 1 at the center position can be prevented.

The support members 120 and the flow path forming portion 300 are detachably formed on the outer covering 14 and hence, the support members 120 and the flow path forming portion 300 can be arranged as desired so that the degree of freedom in designing the support members 120 and the flow path forming portion 300 can be enhanced. Further, by preventing the support members 120 and the flow path forming portion 300 from being arranged at a place where the support members 120 and the flow path forming portion 300 are unnecessary or by recycling the support members 120 and the flow path forming portion 300, a manufacturing cost of the energy storage apparatus 1 can be reduced.

The end portion of the partition member 110 is supported by the flow path forming portion 300 which constitutes a flow path for a discharge through the safety valve 221. That is, by supporting the partition member 110 by making use of the flow path forming portion 300, the partition member 110 can be supported in a stable manner. Accordingly, even when the energy storage device 200 is overheated to a high temperature, the deformation of the whole shape of the energy storage apparatus 1 can be prevented.

By inserting the partition member projecting portions 114 of the partition members 110 into the partition member openings 312 formed in the flow path forming portion 300, the partition members 110 are fixed to the flow path forming portion 300 and hence, the partition members 110 can be supported in a stable manner.

The support members 120 and the flow path forming portion 300 are made of a thermosetting resin. Accordingly, compared with the case where the support members 120 and the flow path forming portion 300 are made of ceramic or the like, the support members 120 and the flow path forming portion 300 which are made of a thermosetting resin can be easily joined to the outer covering 14 using an adhesive agent and can be easily processed and hence, the manufacture of the energy storage apparatus 1 can be simplified. Further, the supporter made of a thermosetting resin is inexpensive compared with the supporter made of ceramic or the like and hence, a manufacturing cost can be reduced.

Although the energy storage apparatus according to the embodiment of the present invention has been described heretofore, the present invention is not limited to the above-mentioned embodiment. That is, it should be construed that the embodiment disclosed herein is merely illustrative but not restrictive in all aspects. The scope of the present invention is not designated by the above-mentioned description but is designated by claims, and it is intended that all modifications which fall within the meaning and the scope equivalent to claims are also included in the scope of the present invention. Further, the configurations which are made by combining any components which the above-mentioned embodiment includes are also included in the scope of the present invention.

For example, in the above-mentioned embodiment, the partition members 110 are supported by the support members 120 and the flow path forming portion 300. However, the partition members 110 may be supported by either one of the support members 120 and the flow path forming portion 300.

In the above-mentioned embodiment, one partition member 110 is supported by two support members 120. However, one partition member 110 may be supported by one or three or more support members 120.

In the above-mentioned embodiment, the support members 120 are mounted on the outer covering body 100 by the support member regulators 103 and the case bottom surface recessed portions 105. However, the support member 120 may be mounted on the outer covering body 100 by either one of the support member regulators 103 and the case bottom surface recessed portions 105.

In the above-mentioned embodiment, the space 125 is formed in the support member 120. However, the support member 120 may be formed of a solid member in which a space is not formed.

In the above-mentioned embodiment, the support members 120 are detachably formed on the outer covering 14. However, the support members 120 may be fixed to the outer covering 14.

In the above-mentioned embodiment, the outer covering 14 and the partition members 110 are formed as separate bodies. However, the partition members 110 may be formed as a part of the outer covering 14 including, for example, the structure where the outer covering body 100 is integrally formed with the partition members 110 or the inner lid 500 is integrally formed with the partition members 110.

The present invention is applicable to an energy storage apparatus or the like where one or more energy storage devices are accommodated in an outer covering.

What is claimed is:

1. An energy storage apparatus comprising:
one or more energy storage devices;
an outer covering arranged outside the one or more energy storage devices;
a partition member arranged on a side of any one of the one or more energy storage devices; and
a supporter which supports the partition member at a predetermined position, wherein
the supporter is formed of a member having higher heat resistance than the outer covering.

2. The energy storage apparatus according to claim 1, further comprising:
a regulator which is arranged adjacent to the supporter, is fixed to the outer covering, and restricts the movement of the supporter in a sideward direction, and
the supporter is formed of a member having higher heat resistance than the regulator.

3. The energy storage apparatus according to claim 1, wherein
the supporter includes two support members which are arranged to pinch the partition member from both sides.

4. The energy storage apparatus according to claim 1, wherein
the outer covering has a recessed portion, and the supporter includes a fitting part which is fitted in the recessed portion.

5. The energy storage apparatus according to claim 1, wherein
a space is formed in the inside of the supporter.

6. The energy storage apparatus according to claim 1, wherein
the supporter is arranged at a position where the supporter supports the partition member arranged at a center position of the outer covering.

7. The energy storage apparatus according to claim 1, wherein
the supporter is configured to be detachably attached to the outer covering.

8. The energy storage apparatus according to claim 1, wherein
any one of the one or more energy storage devices includes a safety valve,
the supporter includes a flow path forming portion which forms a flow path for a discharge through the safety valve, and
the flow path forming portion supports an end portion of the partition member.

9. The energy storage apparatus according to claim 1, wherein
the supporter is formed using a thermosetting resin.

10. The energy storage apparatus according to claim 1, wherein
the outer covering includes an outer covering body having a bottom surface part on which the one or more energy storage devices are mounted, and
the supporter is arranged on the bottom surface part and supports a lower portion of the partition member.

11. The energy storage apparatus according to claim 1, wherein
the one or more energy storage devices is at least two energy storage devices, and
the supporter supports the partition member such that the partition member is arranged between two energy storage devices arranged adjacent to each other.

12. The energy storage apparatus according to claim 1, wherein
the supporter supports the partition member such that the partition member is not brought into contact with the one or more energy storage devices.

13. The energy storage apparatus according to claim 1, wherein
the partition member has a heat insulation property, and
the supporter supports the partition member such that the partition member prevents a transfer of heat generated by one of the two adjacent energy storage devices to the other of the two adjacent energy storage devices.

14. An energy storage apparatus comprising:
a plurality of energy storage devices;
an outer covering arranged outside the plurality of energy storage devices;
a partition member having a heat insulation property and arranged at least between two adjacent energy storage devices of the plurality of energy storage devices; and a supporter which supports the partition member at a predetermined position such that the partition member prevents a transfer of heat generated by one of the two adjacent energy storage devices to the other of the two adjacent energy storage devices,
wherein the supporter is formed of a member having higher heat resistance than the outer covering.

* * * * *